(12) United States Patent
Ciasullo, Jr. et al.

(10) Patent No.: US 10,828,859 B2
(45) Date of Patent: Nov. 10, 2020

(54) MACHINE TO PRODUCE TWISTED PAPER FOR LOOSE FILL PACKAGING

(71) Applicant: ECOPACK GROUP, LLC, Darien, CT (US)

(72) Inventors: Paul F. Ciasullo, Jr., Norwalk, CT (US); Stephen D. Martin, Darien, CT (US); Robert G. Dickie, King City (CA)

( * ) Notice: Subject to any disclaimer, the term of this patent is extended or adjusted under 35 U.S.C. 154(b) by 229 days.

(21) Appl. No.: 15/817,675

(22) Filed: Nov. 20, 2017

(65) Prior Publication Data

US 2019/0152184 A1  May 23, 2019

(51) Int. Cl.

| | |
|---|---|
| *B31D 5/00* | (2017.01) |
| *B26D 1/28* | (2006.01) |
| *B26D 7/22* | (2006.01) |
| *B65G 33/06* | (2006.01) |
| *B65G 33/18* | (2006.01) |
| *B65G 33/26* | (2006.01) |
| *B65G 33/04* | (2006.01) |

(52) U.S. Cl.
CPC ........... *B31D 5/0047* (2013.01); *B26D 1/285* (2013.01); *B26D 7/22* (2013.01); *B31D 2205/0023* (2013.01); *B31D 2205/0047* (2013.01); *B31D 2205/0058* (2013.01); *B31D 2205/0082* (2013.01); *B65G 33/04* (2013.01); *B65G 33/06* (2013.01); *B65G 33/18* (2013.01); *B65G 33/26* (2013.01)

(58) Field of Classification Search
CPC .. B31D 5/0047; B31D 5/0039; B31D 5/0069; B31D 2205/0023; B31D 2205/0047; B31D 2205/0058; B31D 2205/0082; B26D 1/285; B26D 1/22; B31F 1/0003; B65G 33/04; B65G 33/06; B65G 33/18; B65G 33/26; B65H 3/28; B65H 3/30
USPC ................ 198/624, 625; 271/10.11, 72, 314
See application file for complete search history.

(56) References Cited

U.S. PATENT DOCUMENTS

| | | | | |
|---|---|---|---|---|
| 1,468,379 | A | * | 9/1923 | Easton ...................... C10B 7/10 |
| | | | | 202/118 |
| 1,604,133 | A | * | 10/1926 | Rebechini .............. B65G 33/06 |
| | | | | 198/633 |
| 2,680,866 | A | | 6/1954 | Baker et al. |

(Continued)

FOREIGN PATENT DOCUMENTS

| | | |
|---|---|---|
| WO | WO2016082039 | 6/2016 |
| WO | WO2016198944 | 12/2016 |

*Primary Examiner* — Robert F Long
*Assistant Examiner* — Eduardo R Ferrero
(74) *Attorney, Agent, or Firm* — Sand, Sebolt & Wernow Co., LPA

(57) ABSTRACT

A machine produces twisted paper for loose file packaging. The machine includes at least one auger to reduce a dimension, such as diameter, of paper as it is pulled from a roll. The material moves past the auger into a twisting assembly wherein the paper is twisted or rotated about a longitudinal axis of the machine inside a pipe or tube. The pipe or tube includes a cutout or interruption in the sidewall within which a wheel resides. The wheel grasps and advances the paper through the twisting assembly as it rotates. As the paper leaves the twisting assembly it is pulled or otherwise fed through an exist region and is cut into segments of small twisted pieces of paper. The twisted segments of paper are of suitable size for use as loose fill packaging.

16 Claims, 19 Drawing Sheets

(56) References Cited

U.S. PATENT DOCUMENTS

| | | | | |
|---|---|---|---|---|
| 2,869,715 | A * | 1/1959 | Williams | B65G 33/18 198/545 |
| 2,882,802 | A * | 4/1959 | Walker | B31D 5/0047 493/45 |
| 2,890,787 | A * | 6/1959 | Carter | B65G 33/06 198/411 |
| 2,896,397 | A | 7/1959 | Steen | |
| 3,036,624 | A * | 5/1962 | Carter | B65G 47/28 156/566 |
| 3,170,566 | A * | 2/1965 | Zimmermann | A21C 1/065 198/625 |
| 3,235,338 | A * | 2/1966 | Sibbersen | C11B 1/102 422/273 |
| 3,288,077 | A * | 11/1966 | Meskat | B65G 33/18 418/55.1 |
| 3,457,989 | A * | 7/1969 | Nonnenmacher | B29C 48/82 165/87 |
| 3,509,797 | A * | 5/1970 | Johnson | B31D 5/0047 493/340 |
| 3,549,000 | A * | 12/1970 | Christian | B65G 33/18 198/659 |
| 3,606,726 | A * | 9/1971 | Spertus | B31D 5/0073 53/450 |
| 3,650,877 | A | 3/1972 | Johnson | |
| 4,526,128 | A * | 7/1985 | Sorace | B05B 13/0221 118/313 |
| 4,592,193 | A * | 6/1986 | Gustavsson | B65B 63/026 53/530 |
| 4,750,896 | A * | 6/1988 | Komaransky | B31D 5/0047 493/357 |
| 4,993,649 | A * | 2/1991 | Koenig | B02C 19/22 241/224 |
| 5,058,725 | A * | 10/1991 | Gamberini | B65G 33/06 198/406 |
| 5,123,889 | A * | 6/1992 | Armington | B31D 5/0047 493/352 |
| 5,351,899 | A * | 10/1994 | Koenig | B02C 19/22 241/260.1 |
| 5,439,730 | A | 8/1995 | Kelly et al. | |
| 5,468,208 | A * | 11/1995 | Armington | B26D 1/30 493/346 |
| 5,603,565 | A * | 2/1997 | Kohlgruber | B29B 7/489 366/85 |
| 5,698,293 | A | 12/1997 | Nordlund et al. | |
| 5,762,756 | A * | 6/1998 | Scott | D21B 1/30 162/4 |
| 5,924,971 | A * | 7/1999 | Simmons | B31D 5/0047 226/91 |
| 6,106,452 | A | 8/2000 | Baumuller | |
| 6,213,185 | B1 * | 4/2001 | Asghar | B65G 33/06 156/556 |
| 6,311,458 | B2 * | 11/2001 | Tharpe, Jr. | B65B 9/02 53/115 |
| 6,540,652 | B1 * | 4/2003 | Ratzel | B31D 5/0047 493/464 |
| 9,004,742 | B2 * | 4/2015 | Burke | B65G 65/46 366/149 |
| 2005/0155845 | A1 * | 7/2005 | Webb | B65G 33/18 198/663 |
| 2008/0116039 | A1 * | 5/2008 | Ainsworth | B27N 3/14 198/657 |
| 2015/0091248 | A1 * | 4/2015 | Herrmann | B65H 39/105 271/314 |
| 2015/0239166 | A1 * | 8/2015 | Heidemeyer | B29B 7/46 406/53 |

* cited by examiner

MACHINE TO PRODUCE TWISTED PAPER FOR LOOSE FILL PACKAGING

BACKGROUND

Technical Field

The present disclosure relates generally to machines, devices, and methods to produce twisted paper for loose fill packaging. More particularly, the present disclosure relates generally to a device to produce twisted paper for loose fill packaging including an auger assembly, a twisting assembly, a cutting assembly, and an exit wheel assembly.

Background Information

There are many types of loose fill packaging materials, also known as packing peanuts, Styrofoam popcorn, or packing noodles are a common loose-fill packaging and cushioning material that are used to prevent damage to fragile objects during shipping. The loose fill packaging materials are shaped to interlock when compressed and free flow when not compressed. They are roughly the size and shape of an unshelled peanut and commonly made of expanded polystyrene foam (EPS). Two to three inches (50-75 mm) of peanuts are typically used for cushioning and void filling packaging applications.

Polystyrene-based packing peanuts were developed Tektronix Inc. and were made commercially available circa 1965 by Dow Chemical. Originally made from 100% virgin polystyrene resin, peanuts made from 100% recycled polystyrene have been commercially available since the mid-1990s. The color and shape sometimes indicate what it is made of and who made it. Often green is 70% or more recycled polystyrene, white is 70% or more virgin resin and pink means an antistatic agent has been applied; although there are some variations. The most common shapes are similar to an "S", "FIG. 8" or "W." Foam peanuts are very light (usually around 3 grams per litre/0.17 to 0.2 lb per cu ft) and easy to use.

Polystyrene peanuts may be used and reused many times with little or no loss in protection for the product shipped. They may be reused and recycled at many packing and shipping stores. Because of their build-up, polystyrene peanuts may also be used for various methods of home insulation, although it is not recommended because they are not flame retardant.

In the early 1990s, starch-based packing peanuts were developed as a more environment-friendly alternative. The starch in the peanuts comes from crop-based sources rather than petroleum-based polystyrene, and is non-toxic. One of the first brands of biodegradable peanuts, Biofoam, is made from the grain sorghum; other brands are made from corn starch. Biodegradable foam peanuts have no electrostatic charge, another benefit over polystyrene. Being biodegradable and nontoxic, they are also safe for humans and pets if ingested accidentally. However, they are not produced in food-safe conditions and are not recommended for eating. Also, during the manufacturing process, the nutritional value is removed from starch-based packing peanuts. This removes edible components, such as sugars, that would otherwise attract rodents and bugs. Their main drawbacks compared with polystyrene are lower resilience, higher weight (6.5 to 13 g per litre/0.4 to 0.8 lb per cubic foot), dust creation, and higher price. Starch-based peanuts are soluble in water, and polystyrene peanuts are soluble in acetone, but not vice versa. Starch based products can be disposed with down the sink, dissolving on contact with the water.

The most environmental solution would be a 100% paper peanut as it is totally organic and easily can decompose and paper is one of the most recycled materials today. There have been several disclosures and many attempts of designing machines and prototypes to make these environmental paper "peanut nuts" from 40 to 80 lb. paper rolls from generally 16" to 25" wide which is a standard form of supplying craft type paper. However, there are technical challenges in the previous paper machine designs.

SUMMARY

Issues continue to exist with the manufacture of loose fill packaging materials made from paper. More particularly, the mechanics of unrolling heavy paper, getting it folded down and small enough to squeeze into an approximate 1" pipe so it can be twisted then cut into 2" long paper nuts is difficult. The paper roll does not unravel and fold predictably so there were many breakages going into the twisting assembly. This causes a paper jam and time to clear jam and restart. Thus, a need continues to exist for an improved device that produces paper-based loose fill packaging materials. The present disclosure addresses these and other issues.

In one aspect, an exemplary embodiment of the present disclosure may provide a component to for the paper to be pulled off the roll (approx. 16" wide). Another component(s), such as vertical pipes (approximately 6" wide) narrow the paper as it is pulled off the roll. The paper is supported and formed by a horizontal roller at the bottom of the first forming pipes as the roll is generally below the machine. Another component, such as two or more augers geared together, pull and also deforms the paper into a much smaller size that is close to the size of the inner pipe diameter of a rotating (twisting) mechanism. The twisting assembly has geared wheels that protrude into the pipe to hold and advance the paper. The two wheels hold the paper firmly while advancing so that it can be firmly twisted. There is a geared cutter after the twisting assembly that cuts the twisted paper in 1.5" to 2.5" lengths. After the cutter there are two or more geared wheels that help advance and eject the cut lengths from the machine and into a hopper or trough.

The input augers reduce and form the paper cross section and also arrest rotation. The exit rollers wheels also arrest rotation. The twisting assembly between them has two or more opposing geared wheels that hold the paper firmly while advancing the paper so with the input and output of the paper in the machine held from rotating and the middle twisting stage of the machine rotating and also holding the paper, it has a controlled twist per inch and consistent output.

The machine is powered by a speed controlled electric motor which has about a 90 degree drive output for compactness. The motor turns a main drive shaft that engages a gear to turn the twisting assembly, turns the cutter, powers the exit rollers and powers the input augers. The rotating center portion has a rubber wheel that runs in a circular path and contacts the inner rear side of the housing. The rubber wheel is geared to the two toothed gears or wheels in the 1" pipe to hold and advance the twisted paper. The drive shaft also exits the rear of the machine housing. There is a large metal rotating knife on this shaft to cut paper to length. After the cutter stage there is also a rubber wheel or gear that engages another wheel or gear that drives the exit roller(s) or wheel on a flexible drive shaft.

In one aspect, an exemplary embodiment of the present disclosure may provide a device for forming twisted paper for loose fill packaging comprising: a frame; a material pathway adapted to permit paper to move along the pathway from an upstream end to a downstream end; and at least one auger carried by the frame, the at least one auger having an axis, wherein the auger is rotatable about the axis to feed paper past the auger along the material pathway and reduce paper diameter. This exemplary device or another exemplary device may further provide a second auger adjacent the at least one auger and the second auger having a second axis, wherein the second auger is rotatable about the second axis, wherein the second auger and the at least one auger cooperate to feed paper along the material pathway and reduce paper diameter. This exemplary device or another exemplary device may further provide wherein the material pathway is partially defined by the at least one auger and the second auger, wherein paper is adapted to move from the upstream end to the downstream end of the material pathway; and wherein the first and second augers are adjacent the upstream end of the material pathway. This exemplary device or another exemplary device may further provide a motor powering the first and second augers to rotate respectively about the first and second axes; and a twisting assembly carried by the frame, the twisting assembly defining a portion of the material pathway and positioned downstream from at least the one auger and second auger, wherein the motor powers the twisting assembly to twist paper after moving along the material pathway past the first and second augers. This exemplary device or another exemplary device may further provide a drive first wheel connected to a drive shaft connected to the motor; a second wheel on the twisting assembly in operable communication with the drive first wheel, wherein the second wheel rotates about an axis in response to rotation of the drive first wheel; and wherein the twisting assembly rotates about an axis parallel to the drive shaft. This exemplary device or another exemplary device may further provide a transverse wheel on the twisting assembly aligned orthogonal to the second wheel, wherein the transverse wheel is adapted to pull paper along the material pathway through the twisting assembly. This exemplary device or another exemplary device may further provide a pipe on the twisting assembly defining an interruption in the sidewall, wherein a portion of the transverse wheel extends through the interruption into a bore of the pipe, wherein the bore of the pipe defines a portion of the material pathway. This exemplary device or another exemplary device may further provide a cutting device carried by the frame, wherein the cutting device is rotatable about the drive axle, wherein a portion of the cutting device defines a portion of the material pathway; and a blade on the cutting device adapted to revolve past the material pathway and cut paper as the blade crosses the pathway. This exemplary device or another exemplary device may further provide a first exit roller coupled with the drive shaft, wherein rotation of the drive shaft causes the first exit roller to rotate, wherein the first exit roller is positioned adjacent the exit end to the material pathway. This exemplary device or another exemplary device may further provide a flexible shaft bent at an angle coupling the first exit roller to the drive shaft. This exemplary device or another exemplary device may further provide a second exit roller coupled to the first exit roller, wherein the second exit roller is an idle roller rotatable in response to the first exit roller. This exemplary device or another exemplary device may further provide a third wheel in the twisting assembly aligned orthogonal to the second wheel, wherein the third wheel extends into the material pathway and is adapted to grasp and advance the paper along the material pathway as the paper is twisted by the twisting assembly. This exemplary device or another exemplary device may further provide a fourth wheel in the twisting assembly opposing the third wheel and aligned orthogonal to the second wheel, wherein the third wheel and the fourth wheel cooperate to advance the paper along the material pathway. This exemplary device or another exemplary device may further provide a third auger aligned parallel to the first auger and the second auger. This exemplary device or another exemplary device may further provide at least one roller positioned upstream from the at least one auger defining a portion of a U-shaped entrance region.

In yet another aspect, an exemplary embodiment of the present disclosure may provide a method for forming paper into loose fill packaging comprising: moving paper downstream along a material pathway; reducing a dimension of the paper with at least one rotating auger; twisting the paper in a twisting assembly positioned downstream from the at least one rotating auger; and cutting the paper into a plurality of twisted segments of paper with a cutting assembly positioned downstream from the twisting assembly. This exemplary method or another exemplary method may further provide feeding the paper through an entrance region bound, at least partially by, at least one roller. This exemplary method or another exemplary method may further provide moving the plurality of twisted segments of paper through an exit region with at least one exit roller. This exemplary method or another exemplary method may further provide powering the rotating auger, the twisting assembly, and the cutting assembly with a single motor. This exemplary method or another exemplary method may further provide advancing the paper along the material pathway through the twisting assembly with a wheel grasping the paper while rotating about a transverse axis.

In another aspect, the present disclosure may provide a machine that produces twisted paper for loose file packaging. The machine includes at least one auger to reduce a dimension, such as diameter, of paper as it is pulled from a roll. The material moves past the auger into a twisting assembly wherein the paper is twisted or rotated about a longitudinal axis of the machine inside a pipe or tube. The pipe or tube includes a cutout or interruption in the sidewall within which a wheel resides. The wheel grasps and advances the paper through the twisting assembly as it rotates. As the paper leaves the twisting assembly it is pulled or otherwise fed through an exist region and is cut into segments of small twisted pieces of paper. The twisted segments of paper are of suitable size for use as loose fill packaging.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
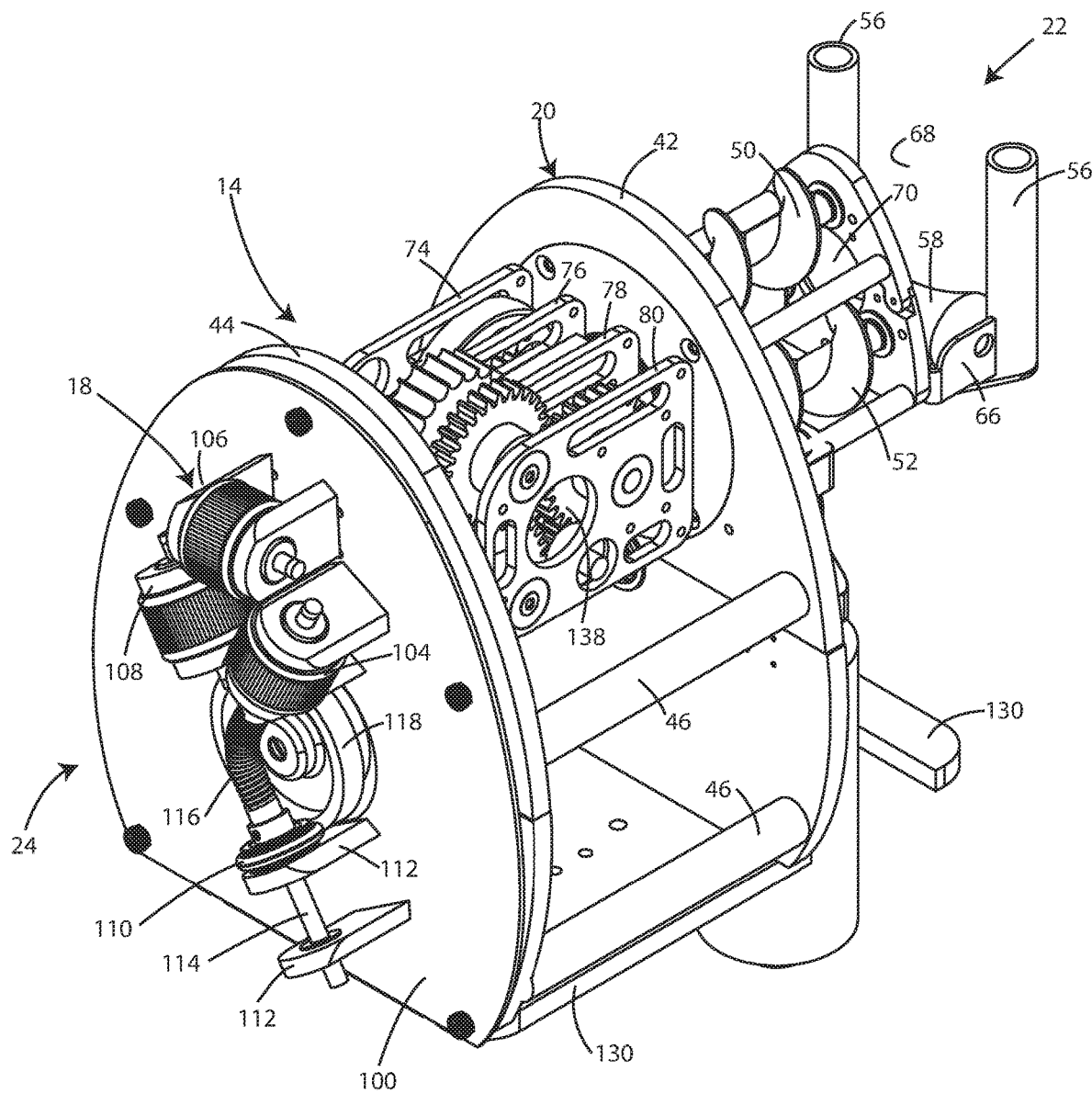
FIG. 1 is a perspective view from the exit end of the machine to produce twisted paper for loose fill packaging in accordance with the present disclosure.

Throughout the figures, a machine to produce twisted paper for loose fill packaging is shown generally at 10 (or at 10A). Machine 10 includes an auger assembly 12, a twisting assembly 14, a cutting assembly 16 (FIG. 14), an exit drive wheel assembly 18, and a frame 20.

As depicted in FIG. 1-FIG. 4, machine 10 includes a first or upstream end 22 and a second or downstream end 24. A longitudinal direction or a longitudinal flow stream direction is defined from the first end 22 to the second end 24. More particularly, as will be described in greater detail below, machine 10 is utilized to form twisted paper for loose fill packaging, and paper which moves through machine 10 flows or moves from the upstream end 22 to the downstream end 24. Machine 10 further includes a first side 26 opposite a second side 28 defining a transverse direction therebetween. Machine 10 includes a top 30 opposite a bottom 32 defining a vertical direction therebetween. The upstream end 22 may also be referred to as an entrance end and the downstream end 24 may also be referred to as an exit end.

As depicted throughout the figures, a paper or material pathway 34 is defined by various elements of the machine 10. Material pathway 34 extends downstream from the upstream end 22 to the downstream end 24. Material pathway 34 is configured to receive material, such as paper 36, there along so as to transform the paper from an initial first state to a second state. As will be described in greater detail below, the initial first state of the paper 36 is in the form of a roll 38 (FIG. 9) and the second state of the paper 36 is a twisted piece 40 of paper (FIG. 9) used for loose fill packaging. The twisted piece 40 that is produced is about 2" long and has a diameter less than about 1". However, other states of paper are possible.

Frame 20 includes a first rigid plate 42 and a second rigid plate 44 connected via at least one longitudinally extending support member 46. The first plate 42 includes a first planar surface that is transversely aligned and faces the upstream end 22. First plate 42 includes an opposite second surface that is transversely aligned and faces the second end 24. First surface and the second surface on the first plate 42 are substantially parallel to each other. The second plate 44 includes a first surface opposing the second surface on the first plate 42. The first surface on second plate 44 faces the first or upstream end 22. Second plate 44 includes a second surface opposite its first surface. The second surface on second plate 44 faces the second or downstream end 24. The first and second plates 42, 44 are spaced apart a longitudinal distance defined by the length of the support member 46. In one particular embodiment, a rigid connection is established between the first plate 42 and the support member 46. Additionally, a rigid connection is established between the support member 46 and the second plate 44. The components of frame 20 should be strong enough to support components of machine 10, however, may be manufactured in a manner to reduce cost and weight of the frame 20.

Auger assembly 12 extends outwardly towards the first end 22 from the first surface of first plate 42. In one particular embodiment, the auger assembly 12 extends in a cantilevered manner towards the first end 22 from a rigid connection with the first surface of first plate 42 of frame 20. The auger assembly 12 may include an auger sub-frame 48, a first auger 50, a second auger 52, a third auger 54, a pair of vertical entrance pipes or rollers 56, and a transverse entrance roller 58. Auger sub-frame 48 includes an end plate 60 that is rigidly connected with a first plate 42 of frame 20. The end plate 60 is spaced apart from an opposing end plate 62 and is supported by a supports 64. Plates 60, 62 have minor surface areas relative to that of plates 42, 44 of frame 20. The first, second and third augers 50, 52, 54 are positioned between end plate 60 and end plate 62. More particularly, the augers are longitudinally aligned and are configured to rotate about their respective longitudinal axes. In one particular embodiment, the first, second and third augers 50, 52, 54 are arranged in a triangular configuration such that the first auger 50 is positioned above the second and third augers 52, 54 which are transversely spaced from one another. Stated otherwise, if viewed in cross-section, the respective axis of each auger would approximate the shape of an equilateral triangle. Each auger includes flights that helically wind around the shaft or axle of the auger. The space between the triangularly arranged augers defines a portion of the material pathway 34 for paper 36 to move therethrough. In one particular embodiment, the augers 50, 52, 54 are configured to assist with the pulling of paper 36 along the material pathway 34 from the roll 38. The augers, 50, 52, 54 assist with twisting and narrowing the diameter of the paper 36 before it enters the twisting assembly 14. An alternative configuration could include only two augers that are arranged in a manner to pull paper 36 along material pathway 34. Similarly, four or more augers could be arranged to pull paper 36 along material pathway 34.

A bracket 66 is mounted to end plate 62 and extends outwardly in a cantilevered manner towards the first end 22. The pair of vertical support pipes or rollers 56 are mounted to the bracket 66 and may be configured to respectively rotate about vertical axes. Additionally, the transverse roller 58 is mounted to bracket 66 and is configured to freely rotate about a transverse axis. Collectively, the pair of vertical pipes or rollers 56 and the transverse roller 48 define a U-shaped entrance region 68 to the material pathway 34. The U-shaped entrance region 68 is positioned upstream or forwardly from an opening 70 defined in end plate 62.

Figure 2:
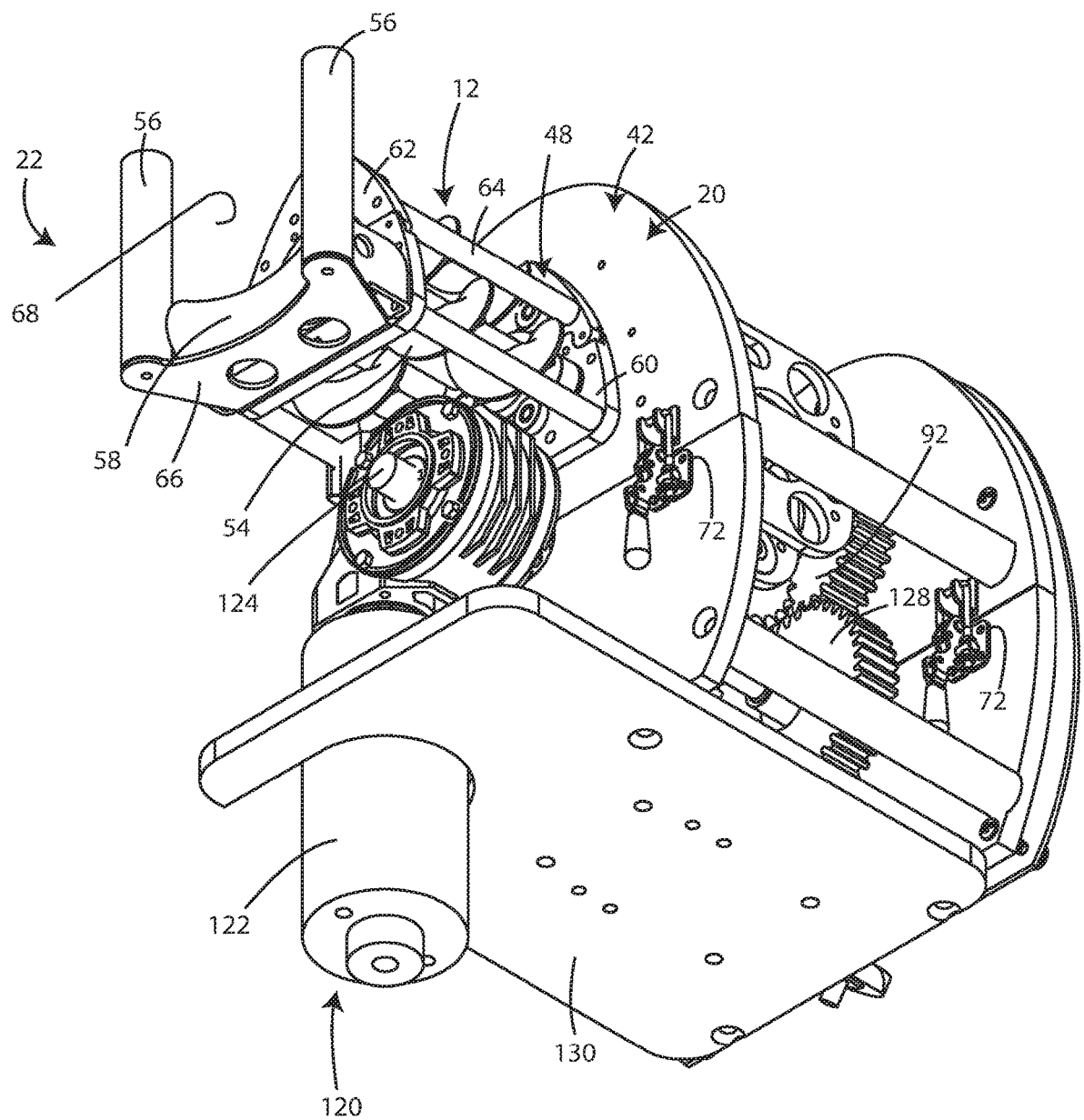
FIG. 2 is a perspective view from the bottom of the entrance end of the machine to produce twisted paper for loose fill packaging in accordance with the present disclosure.

With continued reference to FIG. 2, it is possible for the frame 20 to be formed in two modules or sections. In one particular embodiment, an upper portion of the frame 20 is removable from a lower portion of the frame 20 and may be connected together via a selectively connectable closure or locking mechanism 72. The locking mechanism 72 transects a parting line dividing an upper portion and lower portion of the frame 20. The auger assembly 12 is connected with the upper portion of the frame 20 when constructed in a modular fashion. The twisting assembly 24 may be connected with the upper portion of frame 20. Additionally, the exit wheel assembly 18 may be connected with the upper portion of the frame.

Figure 3:
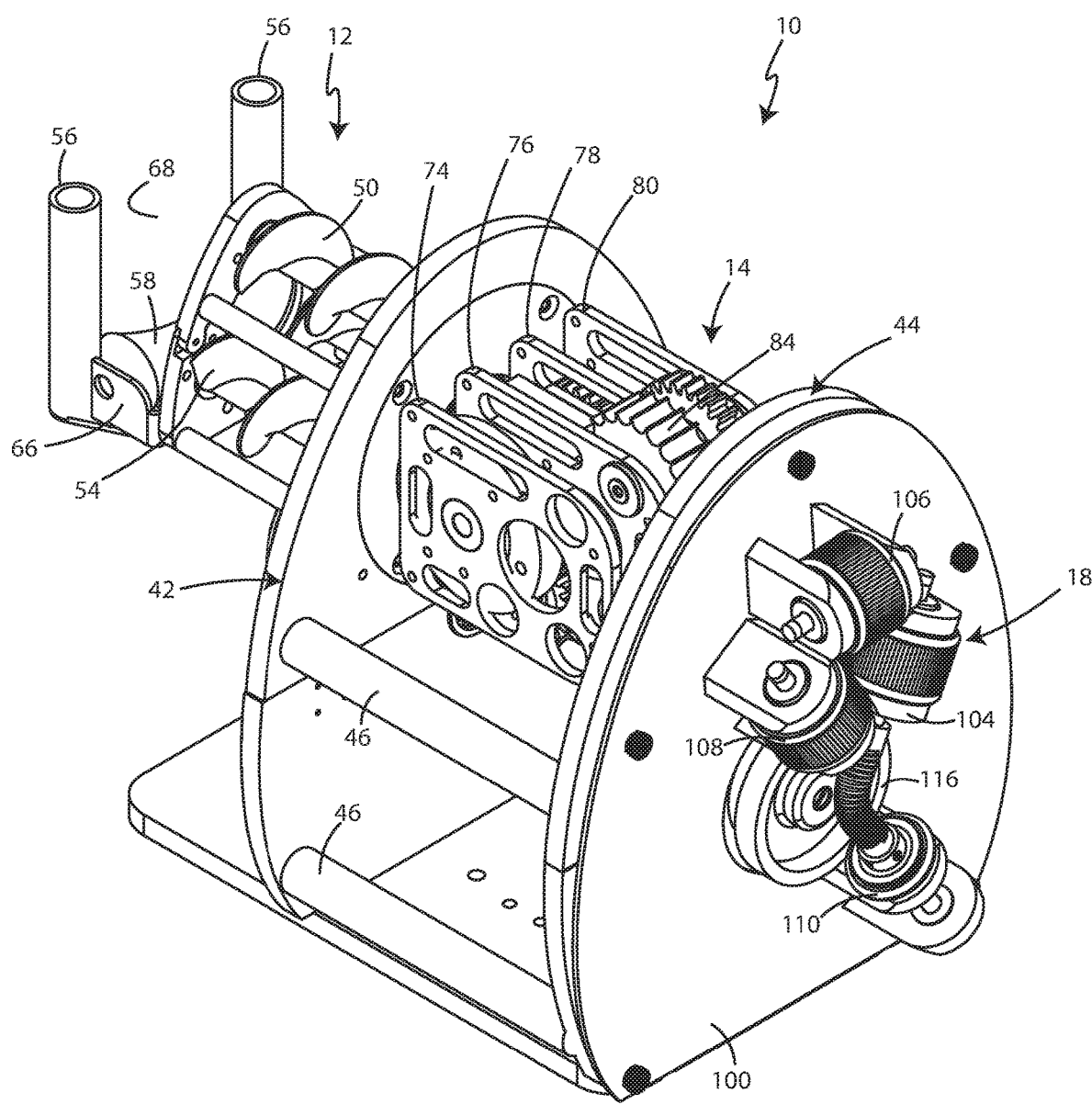
FIG. 3 is a top perspective view of the machine to produce twisted paper for loose fill packaging.
Figure 11:
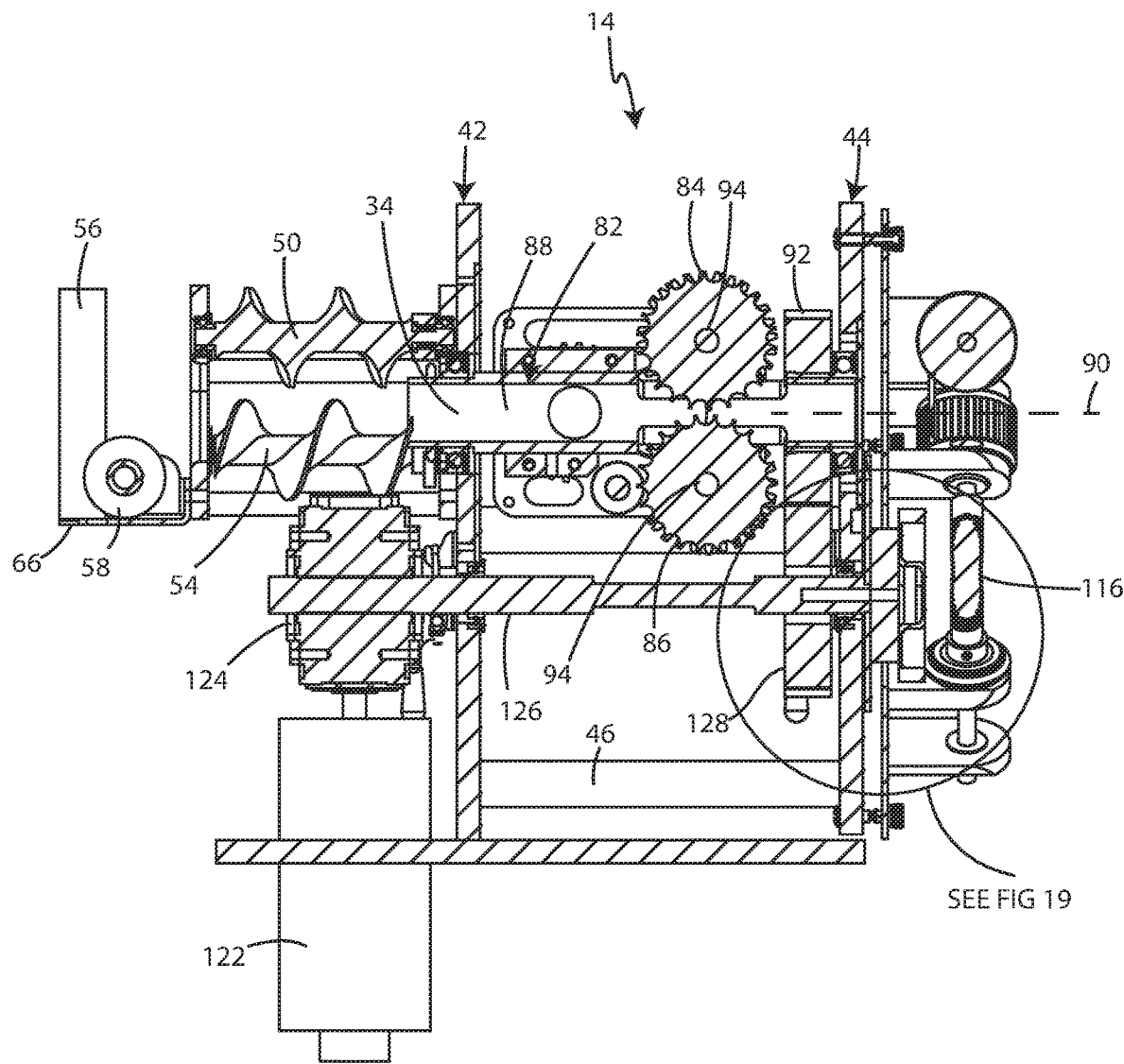
FIG. 11 is a longitudinal cross-section taken along line 11-11 in FIG. 10.
Figure 12:
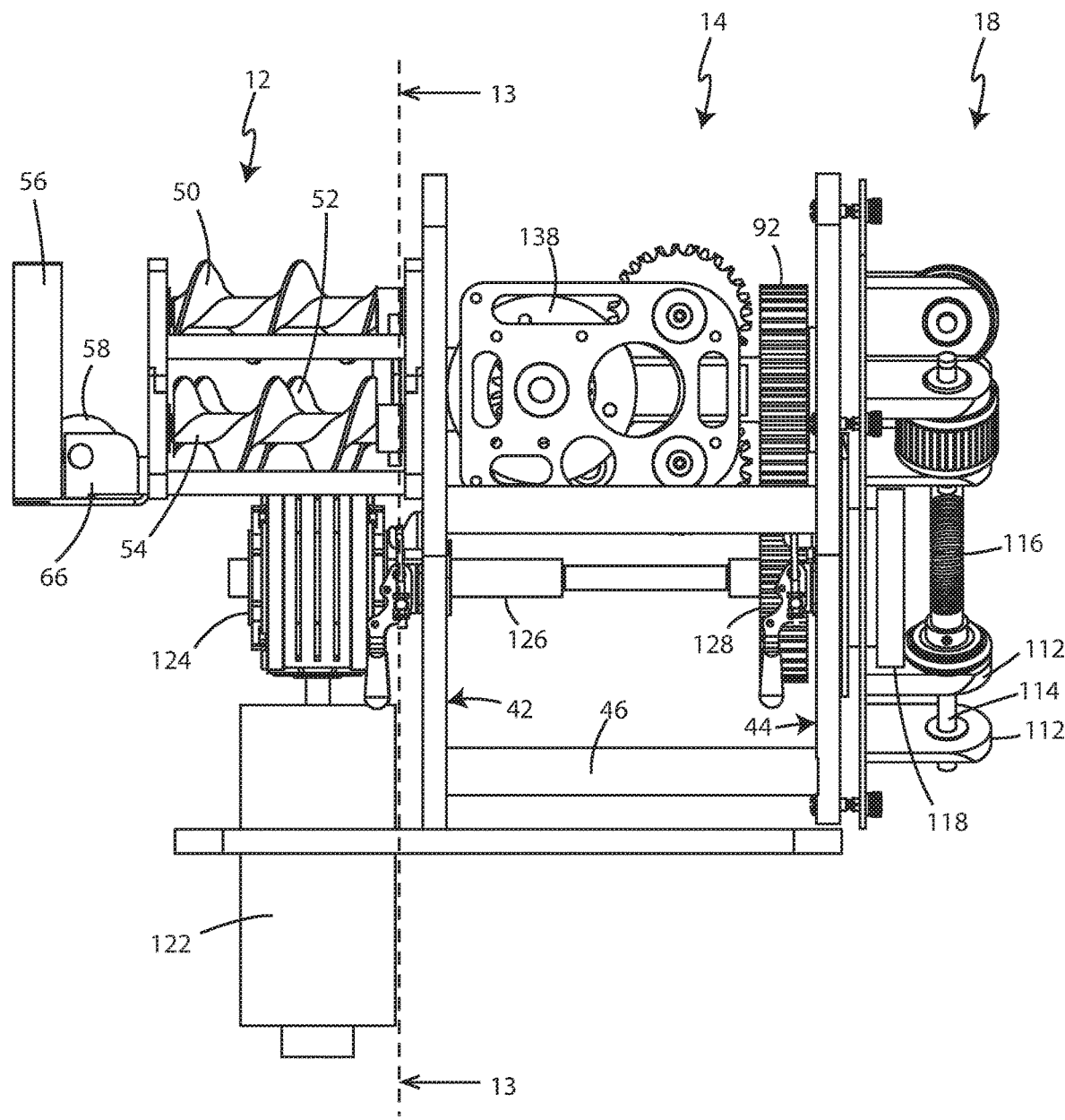
FIG. 12 is a side elevation view of the machine to produce twisted paper for loose fill packaging depicting cross-sectional lines therein.
Figure 13:
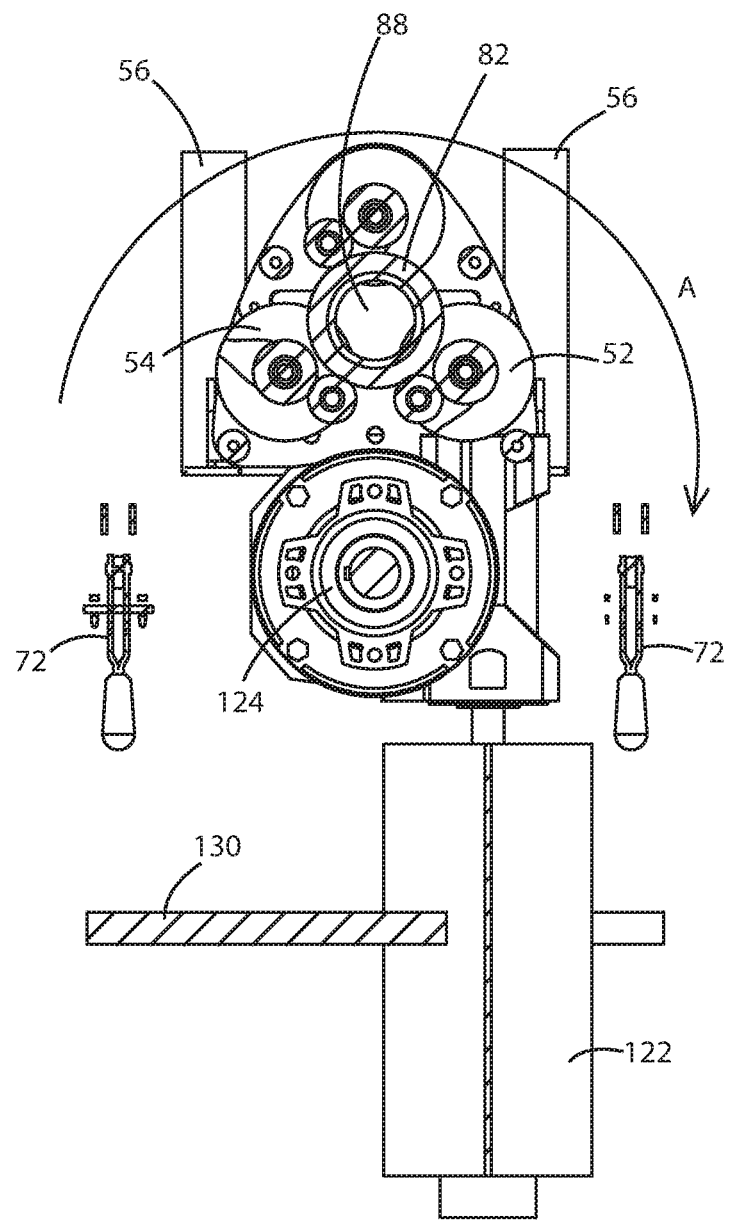
FIG. 13 is a transverse cross-section taken along line 13-13 in FIG. 12.

As depicted in FIG. 3 and FIG. 11, the twisting assembly 14 is positioned between the first plate 42 and the second plate 44 of frame 20. The twisting assembly 14 includes a plurality of longitudinally extending plates that are spaced transversely apart from each other. More particularly, twisting assembly 13 includes a first plate 74, a second plate 76, a third plate 78, and a fourth plate 80. The first plate 74 and the fourth plate 80 are the transverse outermost plates and the second plate 76 and the third plate 78 are the inner plates. The plates 74, 76, 78, 80 are generally parallel to each other extending downstream between the first plate 42 and the second plate 44. Twisting assembly 14 further includes a rotatable pipe 82, a first wheel 84, and a second wheel 86.

With continued reference to FIG. 11, pipe 82 defines a portion of the material pathway 34 via a hollow bore 88 extending longitudinally downstream. A forward end of the pipe 82 extends through the first plate 42 via a bearing and is positioned between the top first auger 50 and the lower second and third augers 52, 54. The bore 88 of pipe 82 extends continuously downstream so as to allow paper 36 to move therethrough. The cylindrical sidewall of pipe 82 is interrupted by cutouts within which the first and second wheels 84, 86 are disposed. The wheels 84, 86 are positioned so as to be rotatable about respective transverse axes intermediate the first and second plates 42, 44. Pipe 88 extends concentrically and longitudinally along a first longitudinal axis 90 to a second end extending through plate 44 via a bearing. In some portions of the machine 10, the material pathway 34 may be parallel to the longitudinal axis 90 of pipe 82. In other instances, portions of the sheet material pathway 34 are coaxial with axis 90. Twisting assembly 14 further includes a drive wheel 92 that is positioned orthogonal to the first and second wheels 84, 86. Drive wheel 92 is positioned downstream from the first wheel 84 and the second wheel 86. In one particular embodiment, drive wheel 92 is positioned upstream from second plate 44. Drive wheel 92 may circumscribe an outer surface of the pipe 82 and include teeth thereon. A rigid connection between wheel 92 and pipe 82 establishes and effectuates rotational movement of pipe 82 about the axis 90. Stated otherwise, wheel 92 is configured to rotate about axis 90 and drive the pipe 82 to rotate in the same manner. As the pipe 82 rotates about the longitudinal axis 90, the first and second wheels 84, 86 are carried by twisting assembly 14 to rotate in the same manner. In one embodiment, axles 94 of the first and second wheels 84, 86 are rigidly connected to the second plate 76 and the third plate 78. Thus, the entire twisting assembly 14 rotates about the longitudinal axis 90 and wheel 92 is driven by a motor on the machine 10. The transverse axles 94 are orthogonal to the longitudinal axis 90.

Figure 14:
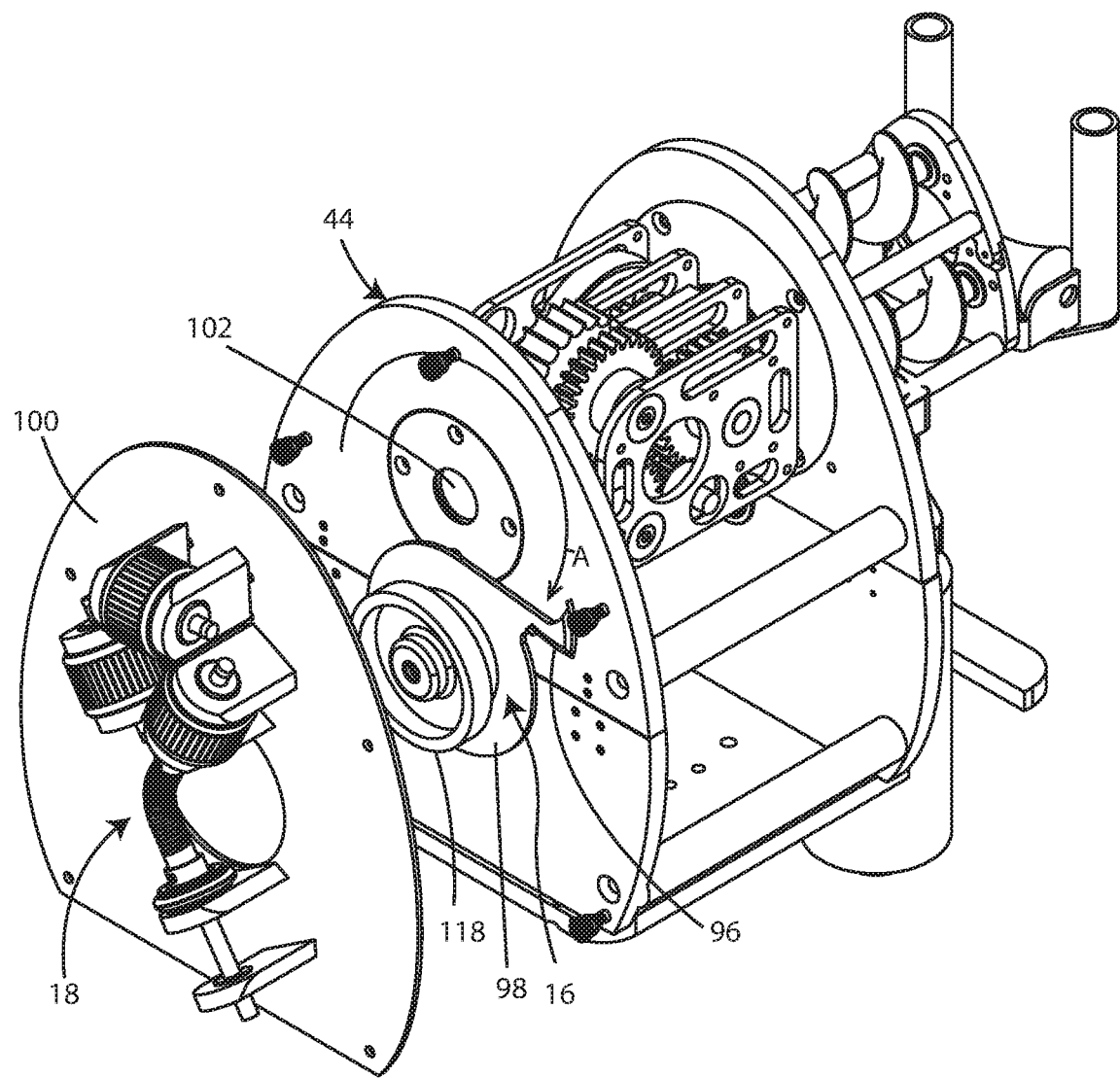
FIG. 14 is partial exploded perspective view depicting the cutting assembly positioned between a support plate and a cover of an exit wheel assembly.
Figure 15:
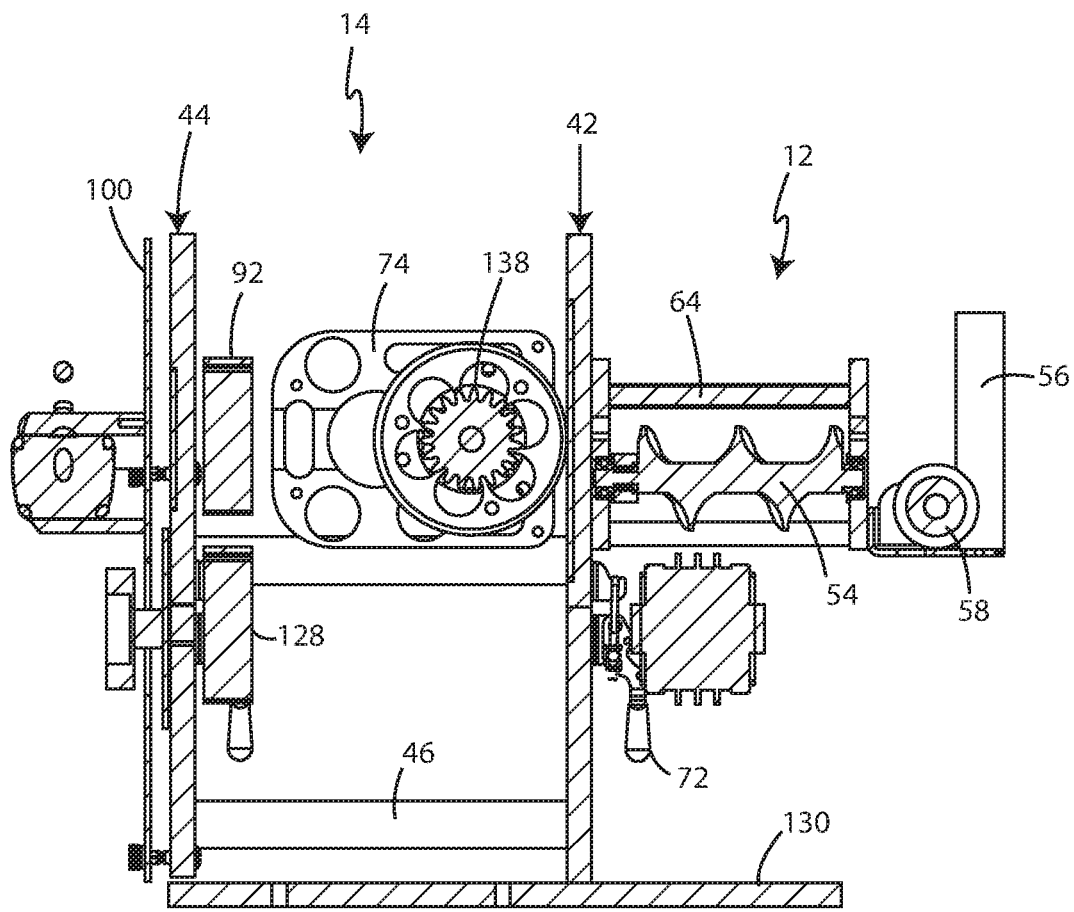
FIG. 15 is a longitudinal cross-section taken along line 15-15 in FIG. 8

The cutting assembly 16 is depicted in a partial exploded view FIG. 14. Cutting assembly 16 includes a cutter blade 96 supported by a rotatable plate 98. The cutting assembly 16 is positioned offset from the second surface of the second plate 44 of frame 20. In one particular embodiment, the cutting assembly 16 is disposed intermediate the second plate 44 and the exit wheel assembly 18. More particularly, the cutting assembly 16 is disposed between the second plate 44 and a cover plate 100 to which the exit wheel assembly 18 is mounted. By covering the blade 96, the machine 10 may improve safety so as to prevent the rotating blade 96 from being exposed to an operator. As will be described in greater detail below, the cutting assembly 16 is positioned below an aperture 102 defined in the second plate 44. The aperture 102 defines a portion of the material pathway 34. Additionally, longitudinal axis 90 from the twisting assembly 14 extends centrally through aperture 102. As will be described in greater detail below, cutting assembly 16 is rigidly connected with a drive shaft 126 and rotates clockwise so as to cause and effectuate the blade 96 to pass by the aperture 102. More particularly, paper 36 moving along the material pathway 34 through the aperture 102 will be cut by the blade 96 as it rotates in the direction of arrow A.

Figure 4:
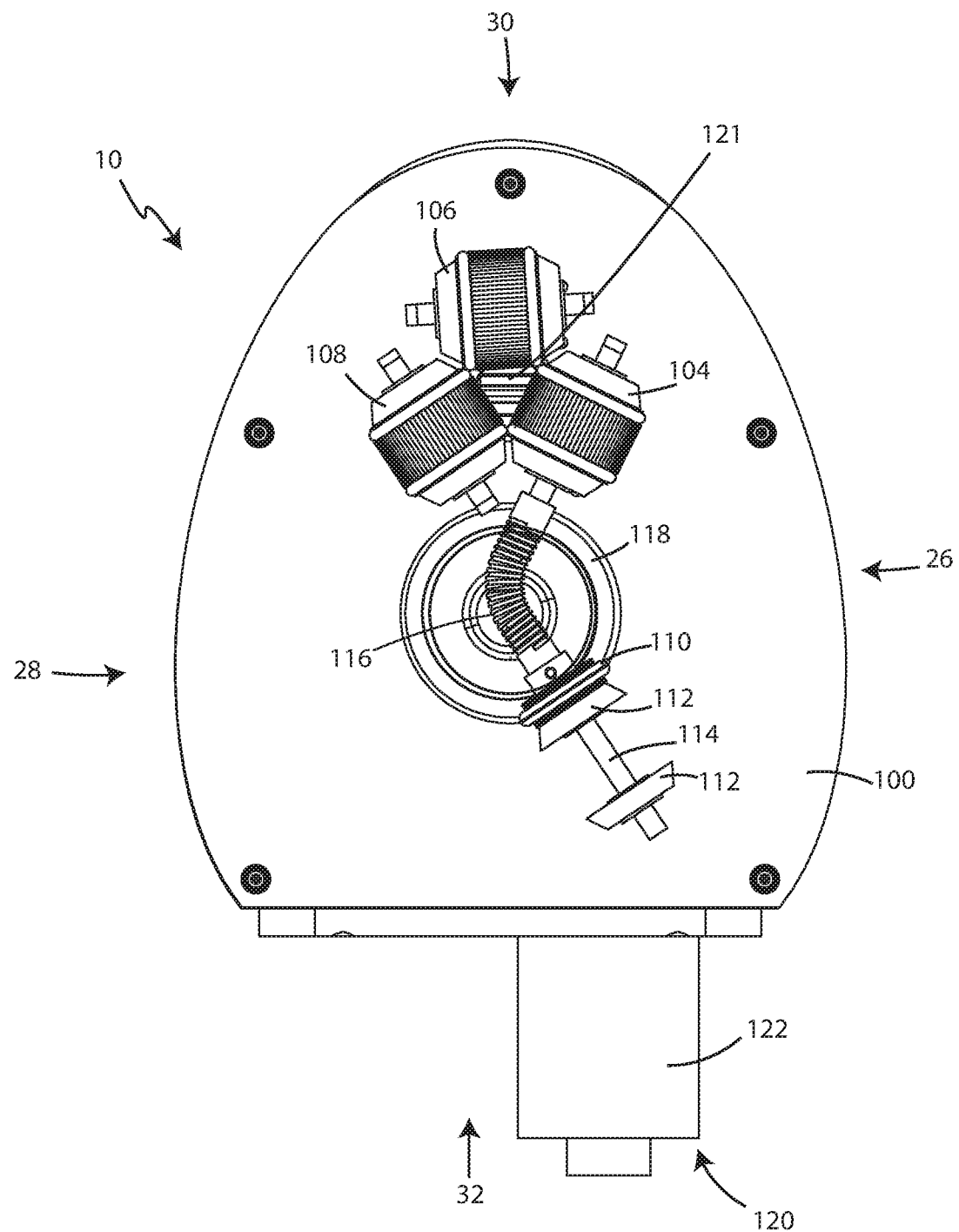
FIG. 4 is an exit end elevation view of the machine to produce twisted paper for loose fill packaging.
Figure 5:
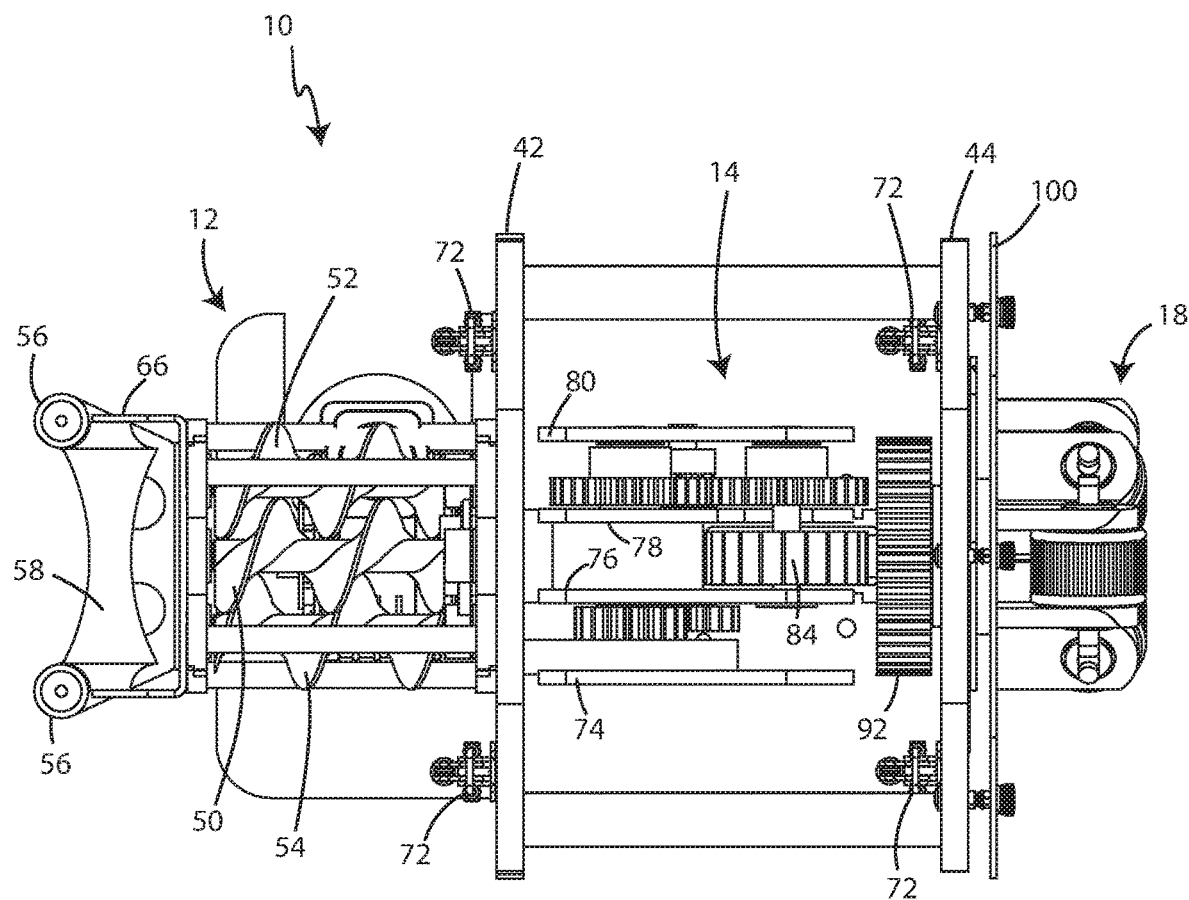
FIG. 5 is a top plan view of the machine to produce twisted paper for loose fill packaging.

As depicted in FIG. 4, exit wheel assembly 18 includes a first roller 104, a second roller 106, and a third roller 108. Exit wheel assembly 18 further includes a drive wheel 110 supported by a flange 112 connected with cover 100. Drive wheel 110 is in operable communication with an axle 114 which extends through the support flange 112. Axle 114 is in operable communication with a flexible drive shaft 116 connected to the first roller 104. Flexible drive shaft 116 may be bent so as to effectuate the connection of roller 104 to drive wheel 110. Drive wheel 110 operatively contacts a wheel 118 which is part of the drive assembly 120 for machine 10. The drive assembly 120 will be described in greater detail below. The first roller 104, the second roller 106, and the third roller 108 are positioned in a triangular configuration to define a triangular exit region 121 defining a portion of the material pathway 34. The triangular shaped exit region 121 is concentric with longitudinal axis 90. The first, second and third rollers 104, 106, 108 are oriented in a manner such that their respective surfaces contact the other two rollers when assembled in a manner to define the triangular exit region 121. Because the first roller 104 is connected with the flexible drive shaft 116, it is considered a drive or driven roller. The second and third rollers 106, 108 are idle rollers inasmuch as their rotation is imparted due to the direct contact during rotation of first rollers 104.

Figure 7:
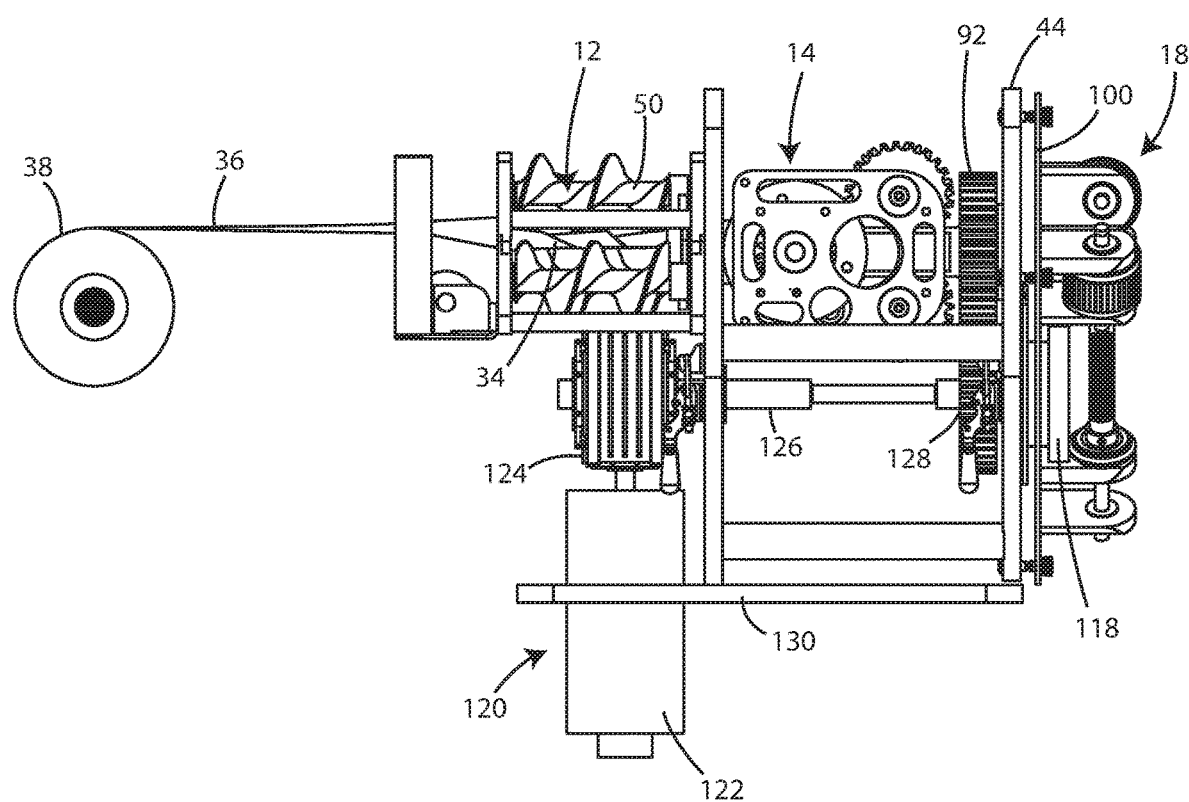
FIG. 7 is an operational side elevation view of the machine to produce twisted paper for loose fill packaging.
Figure 8:
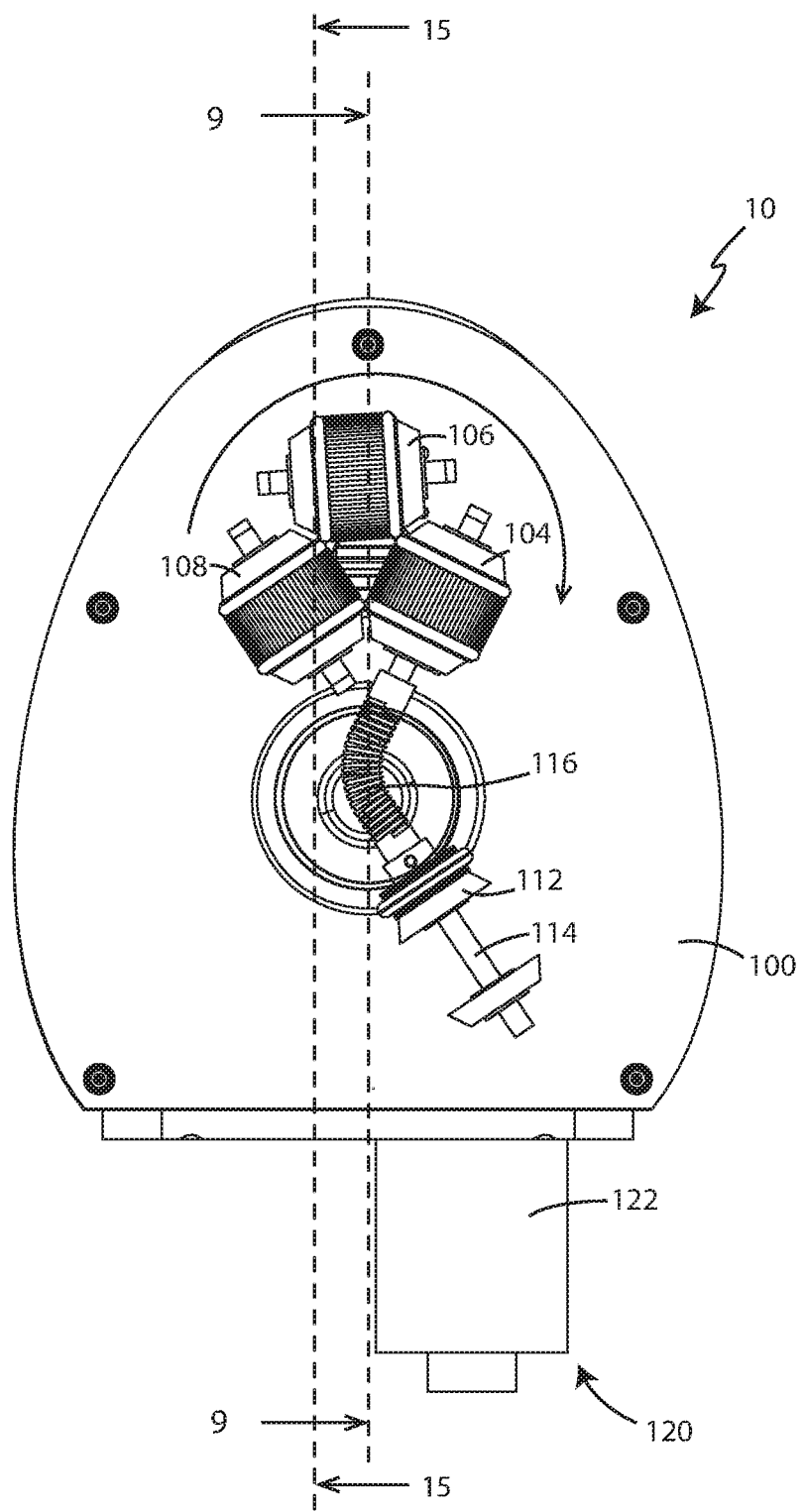
FIG. 8 is an exit end elevation view depicting various cross-sectional lines.

As depicted in FIG. 7, drive assembly 120 includes a motor 122 having a 90° drive output 124 connected with the drive shaft 126. The drive shaft 126 is rigidly connected with a drive wheel 128. Motor 122 may be an electric motor supported and carried by the frame 20. In one particular embodiment, frame 20 further includes a lower plate or lower support member 130 to which motor 122 is mounted. Motor 122 has its 90° drive output 124 connected with a drive shaft 126 that is substantially orthogonal to motor 122. In one particular embodiment, drive shaft 126 extends longitudinally between the first plate 42 and the second plate 44 of frame 20. Additionally, when frame 20 is fabricated in a modular fashion, the drive shaft 126 is connected with the lower portion and is positioned below the twisting assembly 14. Additionally, the 90° drive output 124 on drive assembly 120 is positioned offset from the first side towards the first end of machine 10 relative to first plate 42. In another particular embodiment, 90° output 124 and motor 122 may be positioned vertically below the auger assembly 12. Drive shaft 126 extends through an aperture formed in first plate 42 toward a second end having a rigid connection with drive wheel 128. Drive wheel 128 may be positioned between the first and second plates 42, 44 of frame 20. In one particular embodiment, drive wheel 128 is operatively connected via pinion teeth to the drive wheel 92 on the twisting assembly 14. Drive assembly 120 may further include the wheel 118 which is rigidly connected to drive shaft 126 and is positioned offset from the cover 100 so as to operationally couple to the drive wheel 110 on the exit wheel assembly 18. Drive shaft 126 rotates about a longitudinal axis 132 that is offset below and parallel to axis 90.

Figure 6:
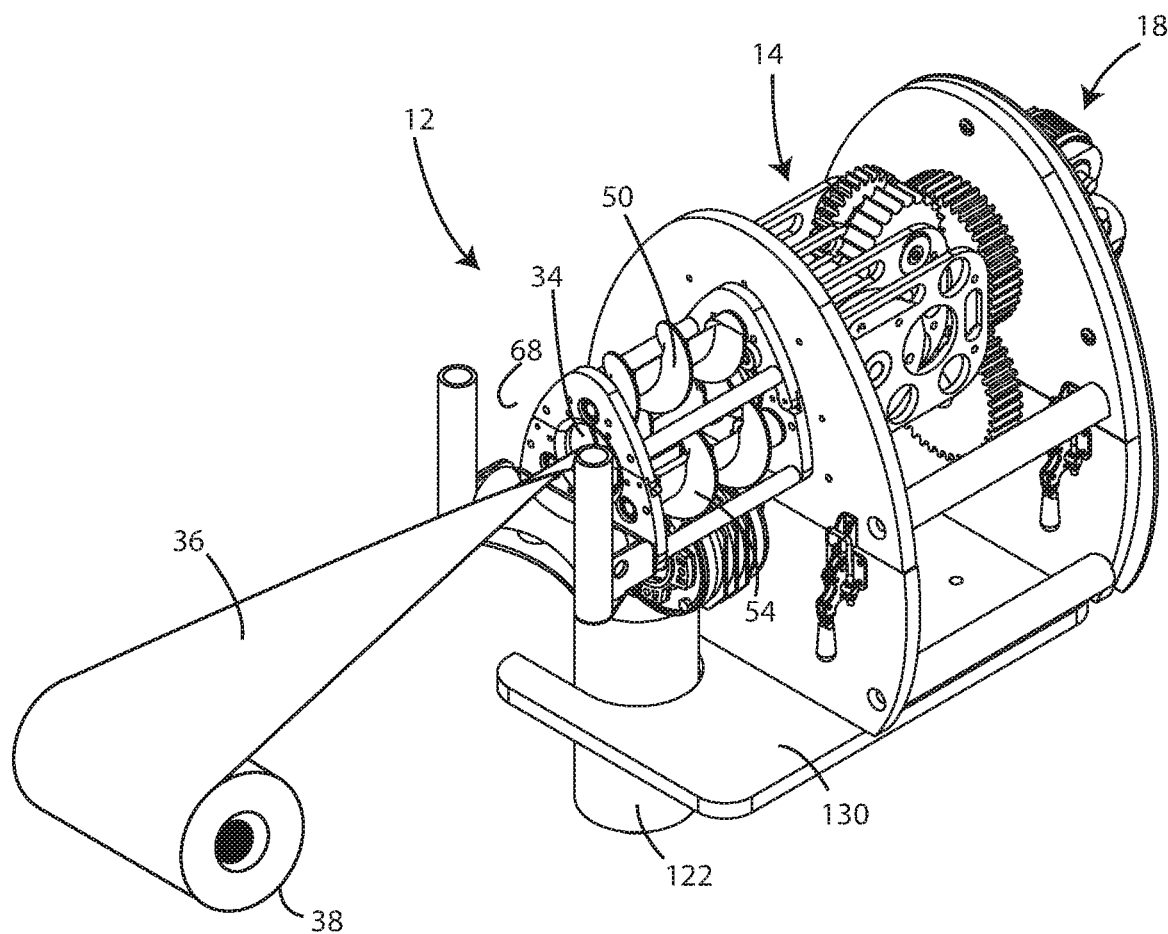
FIG. 6 is an operational perspective view of the entrance end of the machine to produce twisted paper for loose fill packaging.

An exemplary operation of machine 10 is depicted in FIG. 6-FIG. 15. As depicted in FIG. 6, paper 36 is unrolled or unspooled from roll 38 and extends along material pathway 34 through the U-shaped entrance region 68 defined between the pair of rollers 56 and the transverse roller 58. The paper 36 is pulled along the material pathway 34 by the first auger 50 and the second auger 52 and the third auger 54. The paper 36 passes through a hole formed in the end plate 62 as the augers 50, 52, 54 rotate about their respective longitudinal axes. The rotation of augers 50, 52, 54 is imparted via gears 138 in the twisting assembly 14 which rotate in response to rotation of wheel 92 driven by wheel 28 connected to drive shaft 126 of the drive assembly 120. Thus, the drive assembly 120 effectuates the rotation of the augers about their respective longitudinal axis through a plurality of mechanical linkages. The rotation of the augers 50, 52, 54 help to pull and to deform the paper 36 into a smaller size that is similar to the inner diameter of the bore 88 of pipe 82 in the twisting assembly 14. In one embodiment, the inner diameter of pipe 82 is about 1".

As depicted in FIG. 7, the paper 36 passes through the augers 50, 52, 54 and is deformed along the material pathway 34 to enter the bore 88 of pipe 82. The deformation of the paper 36 is accomplished by decreasing a dimension of the paper 36.

Figure 9:
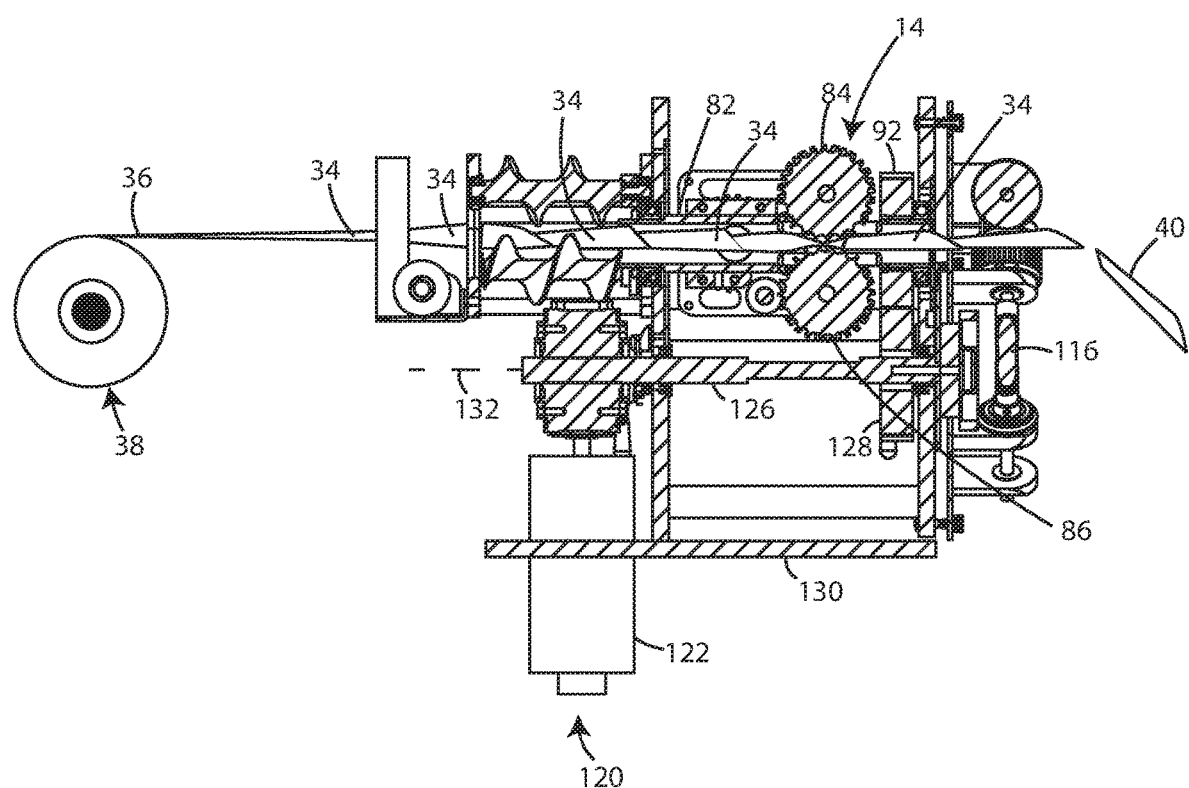
FIG. 9 is a longitudinal cross-section view taken along line 9-9 in FIG. 8.
Figure 10:
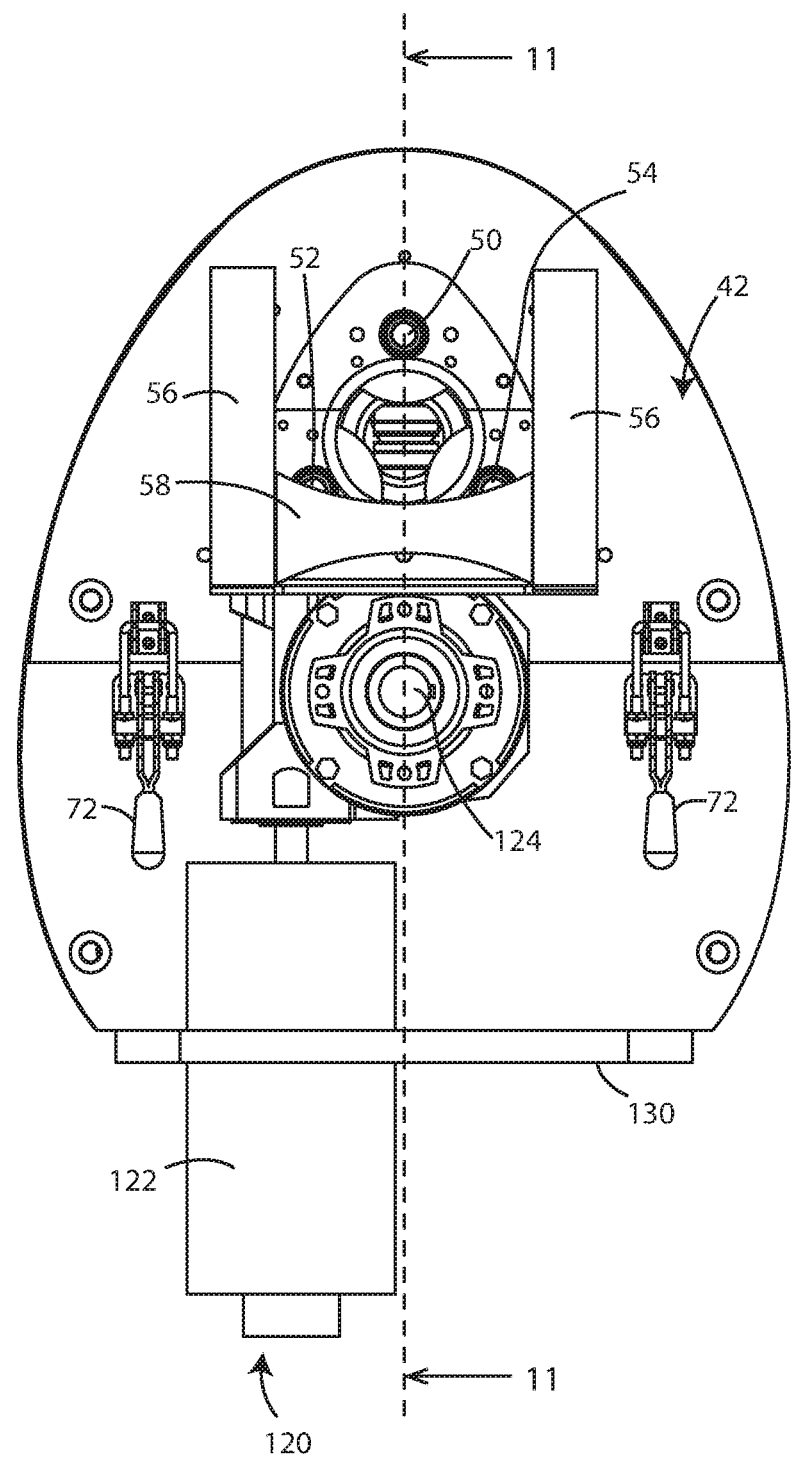
FIG. 10 is an entrance end elevation view of the machine to produce twisted paper for loose fill packaging depicting cross-sectional lines.

As depicted in FIG. 9, as the paper 36 is moving along the material pathway 34, the twisting assembly 14 is rotating about the longitudinal axis 90 with the paper 36 disposed within the bore 88 pipe 82. The twisting of the twisting assembly 14 is accomplished by drive wheel 92 rotating about the longitudinal axis 90 in response to the drive shaft 126 rotating about axis 132. Drive wheel 128 engages drive wheel 92 to rotate the same. The first wheel 84 and the second wheel 86 on the twisting assembly are geared wheels to protrude into the bore 88 through cutouts or interruptions in the sidewall of the pipe 82 to hold and advance the paper 36 as it is twisted. The first wheel 84 and the second wheel 86 hold the paper 36 firmly while advancing the paper 36 so the paper 36 is twisted as the twisting assembly 14 rotates about the longitudinal axis 90.

The paper 36 exits the tube 82 in a twisted manner and passes through the triangular exit region 121 defined between the exit assembly rollers 104, 106, 108. As the paper 36 is exiting through the triangular exit region 121 in a contact engagement with the rollers 104, 106, 108, the plate 98 that is connected with the drive shaft 126 of the drive assembly 120 rotates in the direction of arrow A so as to carry the blade 98 past a portion of the material pathway 34. When the blade 98 passes the material pathway 34, the blade 98 cuts the paper 36 into a segmented portion or a twisted paper segment 40 (see FIG. 9). The segmented paper portion 40 continues to be pulled outwardly through the triangular exit region 121 and may be sent to a downstream destination or storage facility for later use or packaging or shipping. The twisted segment 40 is suitable for loose fill packaging.

Figure 16:
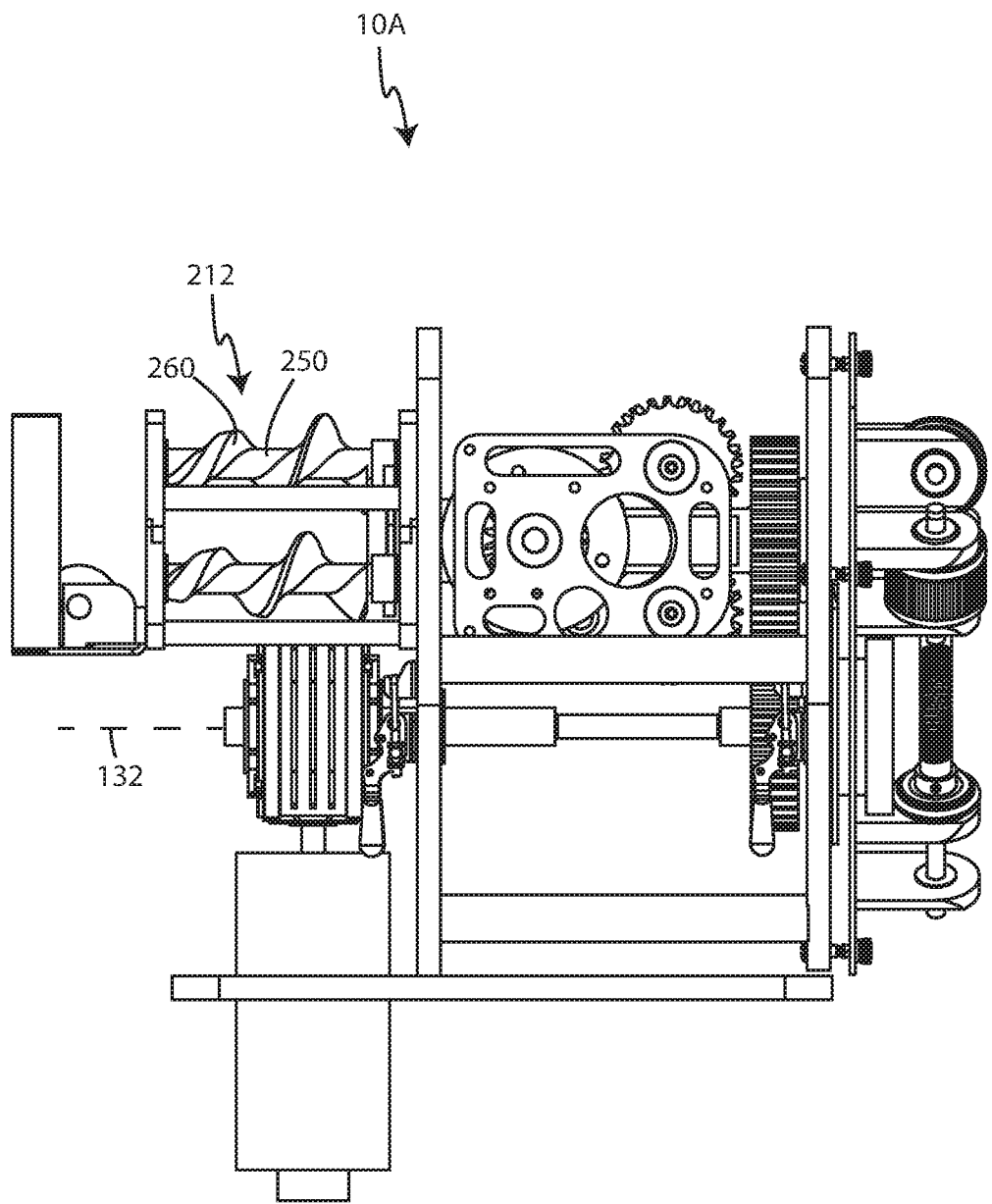
FIG. 16 is a side elevation view of an alternative embodiment of a machine to produce twisted paper for loose fill packaging in accordance with the present disclosure having tapered augers.
Figure 17:
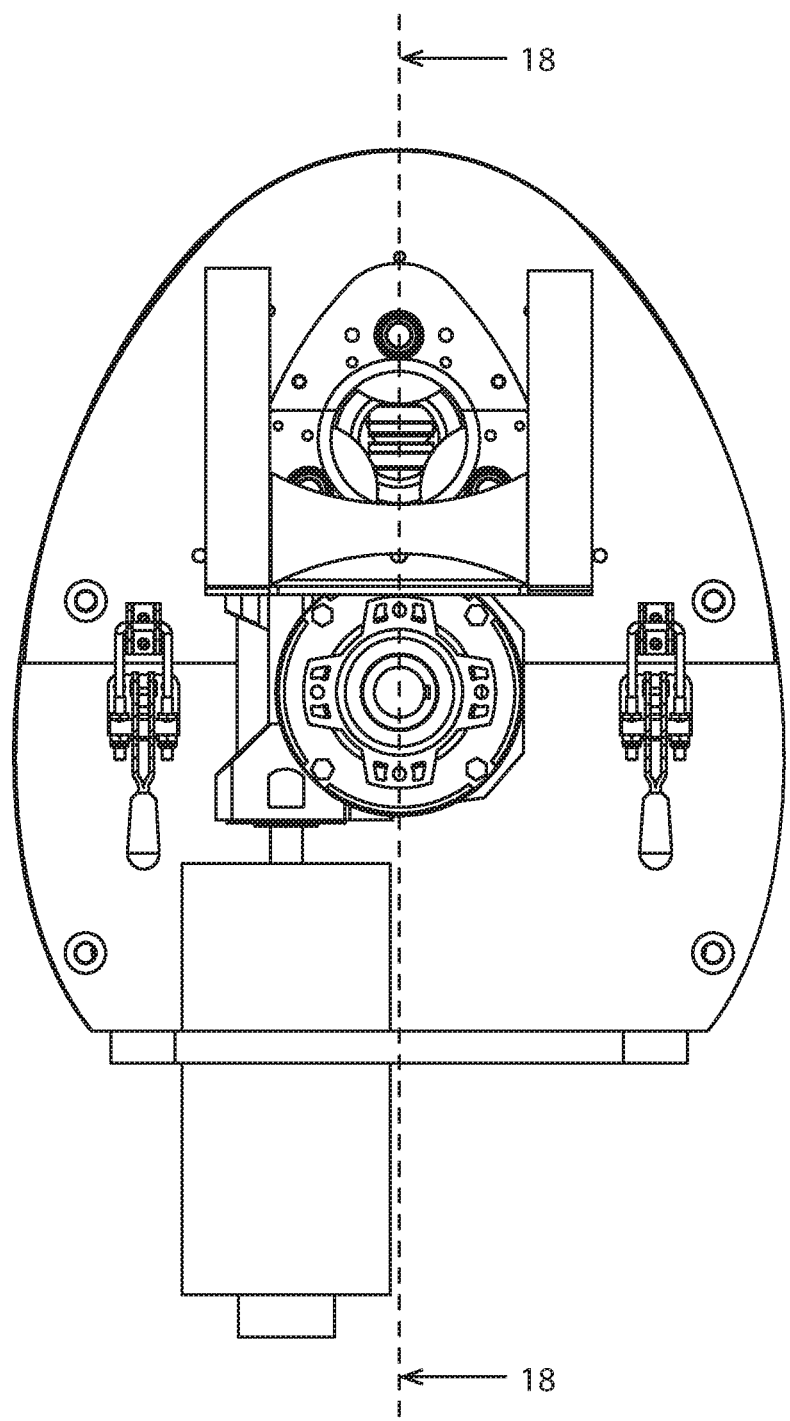
FIG. 17 is an entrance and elevation view of the machine of FIG. 16 depicting cross-sectional lines therein.
Figure 18:
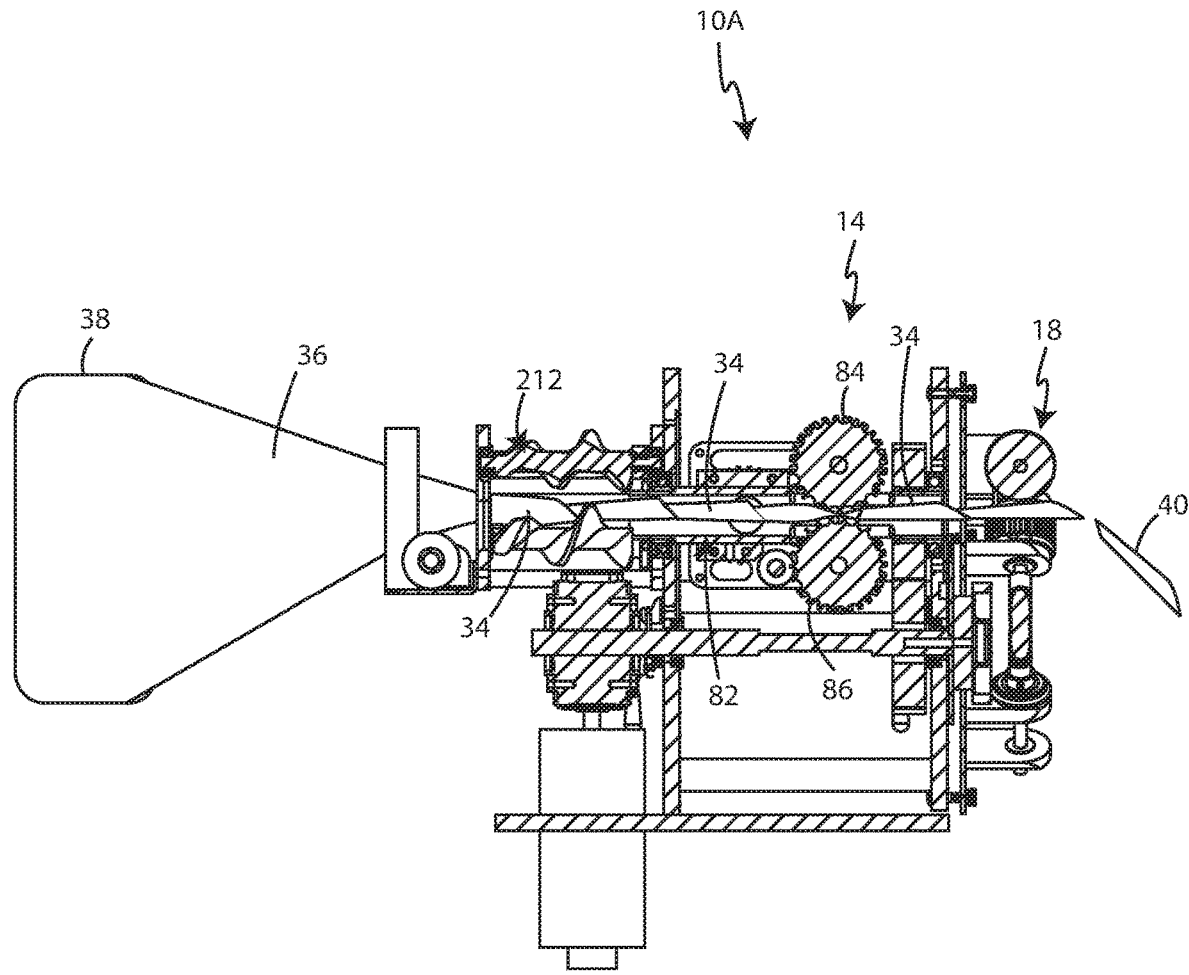
FIG. 18 is a longitudinal cross-section view taken along line 18-18 in FIG. 17 depicting the alternative embodiment of the tapered augers.
Figure 19:
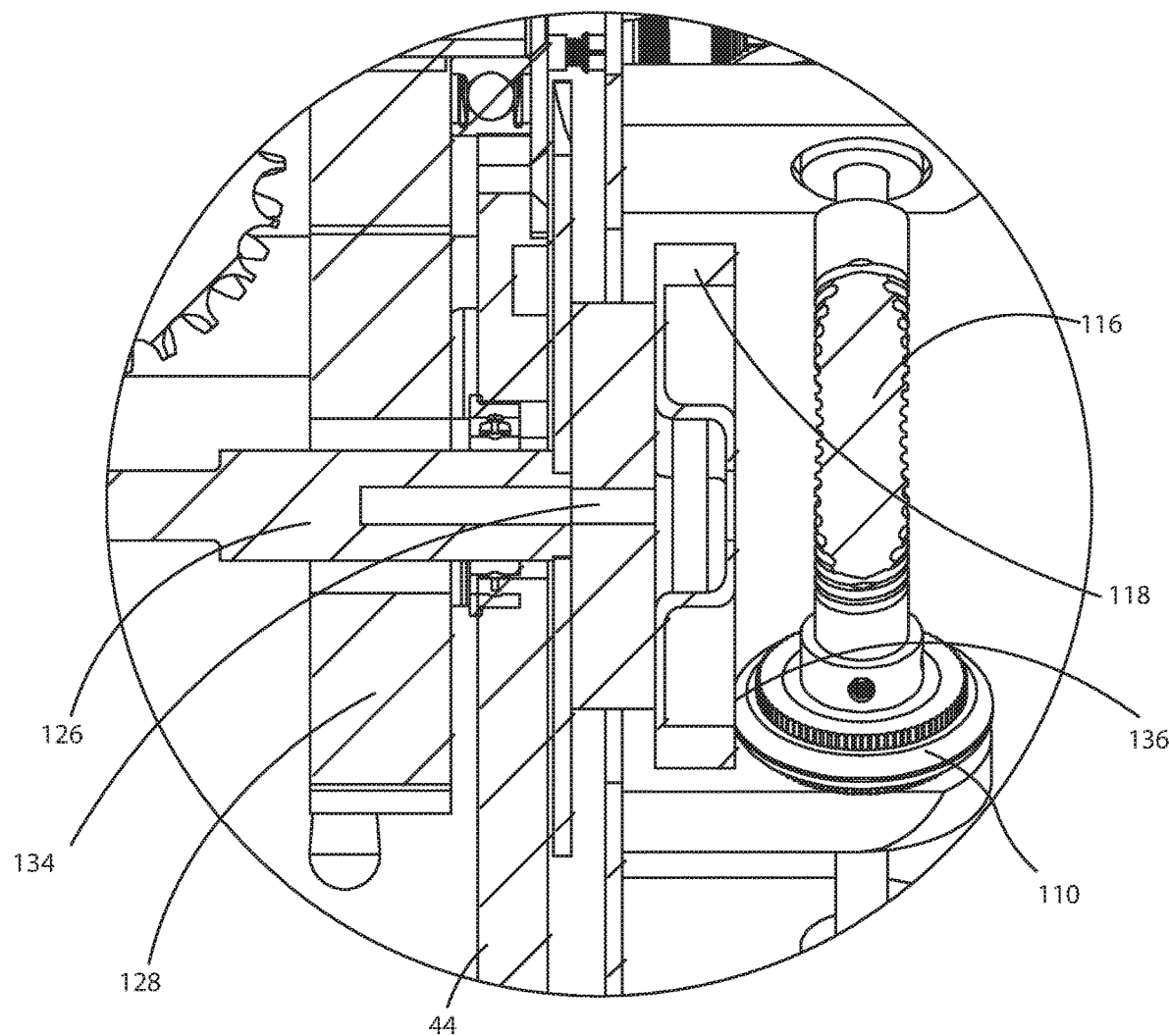
FIG. 19 is an enlarged section view of the region labeled see FIG. 19 in FIG. 11.

FIG. 16-FIG. 18 depict an alternative embodiment of a machine to produce twisted paper for loose fill packaging shown generally at 10A. Machine 10A includes many similar components and elements of machine 10 and similar reference numerals represent similar parts and are not repeated herein for brevity. Machine 10A includes an auger assembly 212 that is different from the auger assembly 12 of machine 10 inasmuch as the augers include tapered flights. More particularly, a first auger 250 includes a tapered flight 260 that expands radially outward as the auger 250 extends from its upstream end to its downstream end. Stated otherwise, the radius associated with the flight 260 of the first auger 250 increases as the flight 260 extends longitudinally along the auger 250. In one particular embodiment, the tapering of the auger has the narrowest diameter near the upstream end of the auger and has the greatest diameter near the downstream end of the auger. As shown in FIG. 19, the tapering of the auger assists with the pulling of the paper 36 along the material pathway 34 through the auger assembly 212. The remaining portions of machine 10A are consistent with that of machine 10 described above.

FIG. 19 depicts an enlarged section view of the connection between the drive shaft and portions of the exit wheel assembly 18. More particularly, wheel 128 is rigidly connected to drive shaft 126 offset from second plate 44 of frame 20. An extension portion 134 is rigidly connected with drive shaft 126 and extends through the second plate 44 of frame 20. The drive shaft extension 134 is coupled with the wheel 118. In one particular embodiment, wheel 118 may be a rubber wheel or other polymer wheel. However, it is entirely possible that wheel 118 may be fabricated from a rigid material, such as metal. Wheel 118 contacts wheel 110 on the exit wheel assembly 18 at a contact point 136.

The machine 10, 10A of the present disclosure may be operated in different manners so as to effectuate different sizes of segments 40 to be produced through the machine. In one particular embodiment, the speed at which the blade rotates may be geared so as to be faster that the material moving along the pathway so as to effectively shred the paper by producing very short segments less than about 1" in length or even less than about ½" in length. Alternatively, an embodiment is envisioned that could produce a semi-segmented piece of paper that is not completely cut so as to effectively create "sausage link" output paper where twisted forms of paper are connected together by tightly rolled sections approximating the look of sausage links. In this scenario, the blade assembly 16 may be replaced with a secondary twisting assembly.

The machine 10, 10A of the present disclosure may be operatively connected to control logic or a control computer. This computer or logic includes electrical circuitry to manage the various speeds and forces imparted by components of the machine 10, 10A as the paper 36 is pulled along the material pathway 34. For example, the control logic or control computer determines the rotation of the augers in the auger assembly 12. Additionally, the control logic or control computer determines the rotation of the wheels and gears in the twisting assembly 14. Additionally, the control logic or control computer determines the rotation of the drive shaft in the drive assembly 120.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

Further, it should be appreciated that the computer utilized to control the various components machine 10, 10A may be embodied in any of a number of forms, such as a rack-mounted computer, a desktop computer, a laptop computer, or a tablet computer. Additionally, the computer may be embedded in a device not generally regarded as a computer but with suitable processing capabilities, including a Personal Digital Assistant (PDA), a smart phone or any other suitable portable or fixed electronic device.

Also, the computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs or instruction that, when executed on one or more computers or other processors, perform methods that implement the various embodiments of the invention discussed above, such as setting the various parameters to form twisted paper for loose fill packaging. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of preforming the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed is:

1. A device for forming twisted paper for loose fill packaging comprising:
   a frame;
   a roll of paper;
   a material pathway operative to permit the paper to move from an upstream end to a downstream end of the device;
   an end plate located towards the upstream end of the device, the end plate having a hole, the paper passes through the hole formed in the end plate; and
   an auger assembly containing at least three augers carried by the frame, each of the at least three augers having an axis, wherein the at least three augers are rotatable about their axis, each auger includes a flight around the axis of the auger, the at least three augers are transversally separated apart so that the flights do not intermesh and create a space that defines a portion of the material pathway for the paper to move therethrough, and the at least three augers assist with the pulling of the paper along the material pathway, and the at least three augers assist with changing the shape of the paper from substantially flat shape to substantially cylindrical shape.

2. The device of claim 1, further comprising:
   a motor to rotate the first auger and the second auger; and
   a twisting assembly carried by the frame, the twisting assembly defining a portion of the material pathway and positioned downstream from the first auger and the second auger, wherein the motor powers the twisting assembly to twist paper after moving along the material pathway past the first and second augers.

3. The device of claim 2, further comprising:
   a drive first wheel connected to a drive shaft connected to the motor;
   a second wheel on the twisting assembly in operable communication with the drive first wheel, wherein the second wheel rotates about a longitudinal axis in response to rotation of the drive first wheel; and
   wherein the twisting assembly rotates about the longitudinal axis.

4. The device of claim 3, further comprising:
   a transverse third wheel on the twisting assembly aligned orthogonal to the second wheel, wherein the transverse wheel is adapted to pull paper along the material pathway through the twisting assembly.

5. The device of claim 4, further comprising:
   a pipe on the twisting assembly defining an interruption in a cylindrical wall, wherein a portion of the transverse wheel extends through the interruption into a bore defined by the pipe, wherein the bore of the pipe defines a portion of the material pathway.

6. The device of claim 4, further comprising:
   a transverse fourth wheel in the twisting assembly opposing the third wheel and aligned orthogonal to the second wheel, wherein the third wheel and the fourth wheel cooperate to advance the paper along the material pathway.

7. The device of claim 3, further comprising:
   a cutting device carried by the frame, wherein the cutting device is rotatable with the drive shaft, wherein a portion of the cutting device defines a portion of the material pathway; and
   a blade on the cutting device adapted to revolve past the material pathway and cut paper as the blade crosses the pathway.

8. The device of claim 7, further comprising:
   a first exit roller coupled with the drive shaft, wherein rotation of the drive shaft causes the first exit roller to rotate, wherein the first exit roller is positioned adjacent the downstream end of the material pathway.

9. The device of claim 8, further comprising:
   a flexible shaft bent at an angle coupling the first exit roller to the drive shaft.

10. The device of claim 8, further comprising:
    a second exit roller coupled to the first exit roller, wherein the second exit roller is an idle roller rotatable in response to the first exit roller.

11. The device of claim 1, further comprising:
    at least one roller positioned upstream from the at least one auger defining a portion of a U-shaped entrance region.

12. A method for forming paper into loose fill packaging comprising:
    moving paper downstream along a material pathway;
    reducing a dimension of the paper with an auger assembly containing a frame, a material pathway; an end plate located towards the upstream end of the device, the end plate having a hole, at least three augers carried by the frame, each of the at least three augers having an axis, wherein each of the at least three augers are is rotatable about the axis, each auger includes a flight around the axis of the auger, the at least three augers are transversally separated apart so that the flights do not intermesh and create a space that defines a portion of the material pathway for the paper to move therethrough;
    twisting the paper in a twisting assembly positioned downstream from the auger assembly;
    cutting the paper into a plurality of twisted segments of paper with a cutting assembly positioned downstream from the twisting assembly.

13. The method of claim 12, further comprising:
    feeding the paper through an entrance region bound, at least partially by, at least one roller.

14. The method of claim 12, further comprising:
    moving the plurality of twisted segments of paper through an exit region with at least one exit roller.

15. The method of claim 12, further comprising:
    powering the rotating auger, the twisting assembly, and the cutting assembly with a single motor.

16. The method of claim 12, further comprising:
    advancing the paper along the material pathway through the twisting assembly with a wheel grasping the paper while rotating about a transverse axis.

* * * * *